United States Patent
Yu et al.

(10) Patent No.: US 10,784,985 B2
(45) Date of Patent: Sep. 22, 2020

(54) WLAN LINK ADAPTATION METHOD AND NETWORK DEVICE

(71) Applicant: HUAWEI TECHNOLOGIES CO., LTD., Shenzhen (CN)

(72) Inventors: Jian Yu, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/853,937

(22) Filed: Dec. 25, 2017

(65) Prior Publication Data

US 2018/0123727 A1 May 3, 2018

Related U.S. Application Data

(63) Continuation of application No. PCT/CN2015/082358, filed on Jun. 25, 2015.

(51) Int. Cl.
*H04W 72/04* (2009.01)
*H04L 1/00* (2006.01)
(Continued)

(52) U.S. Cl.
CPC .......... *H04L 1/0003* (2013.01); *H04L 1/0006* (2013.01); *H04L 1/0009* (2013.01);
(Continued)

(58) Field of Classification Search
CPC ... H04L 1/0003; H04L 1/0006; H04L 1/0026; H04L 1/0027; H04L 1/0009; H04L 25/0202; H04L 27/0008; H04W 24/10
See application file for complete search history.

(56) References Cited

U.S. PATENT DOCUMENTS

| 8,619,814 B2 | 12/2013 | Seok |
| 2012/0051246 A1* | 3/2012 | Zhang .................. H04L 1/0001 370/252 |

(Continued)

FOREIGN PATENT DOCUMENTS

| CN | 102696182 A | 9/2012 |
| CN | 103270788 A | 8/2013 |

(Continued)

OTHER PUBLICATIONS

IEEE Std 802.11n—2009,Part 11:Wireless LAN Medium Access Control (MAC) and Physical Layer (PHY) Specifications,Amendment 5:Enhancements for Higher Throughput,dated Sep. 11, 2009,total 536 pages.

(Continued)

*Primary Examiner* — Hassan Kizou
*Assistant Examiner* — Mahbubul Bar Chowdhury
(74) *Attorney, Agent, or Firm* — Kilpatrick Townsend & Stockton LLP

(57) ABSTRACT

A WLAN link adaptation method and a network device are provided, and can provide accurate link adaptation for each user in an OFDMA communications system. Embodiments of the present application include: obtaining, by a first network device, a target channel information measurement result, where the target channel information measurement result is a measurement result obtained by measuring channel information over target bandwidth; and determining, by the first network device, a modulation and coding scheme MCS of a link according to the target channel information measurement result.

29 Claims, 19 Drawing Sheets

(51) Int. Cl.
*H04W 24/10* (2009.01)
*H04L 25/02* (2006.01)
*H04L 27/00* (2006.01)

(52) U.S. Cl.
CPC .......... *H04L 1/0026* (2013.01); *H04L 1/0027* (2013.01); *H04L 25/0202* (2013.01); *H04W 24/10* (2013.01); *H04L 27/0008* (2013.01)

(56) References Cited

U.S. PATENT DOCUMENTS

| | | | | |
|---|---|---|---|---|
| 2012/0063439 | A1* | 3/2012 | Seok | H04L 1/0025 370/338 |
| 2012/0213261 | A1* | 8/2012 | Sayana | H04L 5/0048 375/224 |
| 2013/0033998 | A1* | 2/2013 | Seo | H04W 24/00 370/252 |
| 2013/0235836 | A1* | 9/2013 | Roh | H04L 1/0031 370/329 |
| 2013/0294397 | A1 | 11/2013 | Lee et al. | |
| 2013/0315219 | A1 | 11/2013 | Cheong et al. | |
| 2014/0029453 | A1* | 1/2014 | Trainin | H04W 24/10 370/252 |
| 2014/0293916 | A1* | 10/2014 | Sohn, III | H04L 1/0025 370/329 |
| 2014/0369302 | A1* | 12/2014 | Abraham | H04L 5/0053 370/329 |
| 2015/0117321 | A1 | 4/2015 | Chen et al. | |
| 2015/0319636 | A1* | 11/2015 | Lee | H04B 17/345 370/252 |
| 2016/0262051 | A1* | 9/2016 | Merlin | H04L 5/0057 |
| 2016/0295513 | A1* | 10/2016 | Moon | H04B 7/0634 |
| 2016/0330006 | A1* | 11/2016 | Zhang | H04L 5/0048 |
| 2016/0366701 | A1* | 12/2016 | Chu | H04W 74/0816 |
| 2017/0222768 | A1* | 8/2017 | Lee | H04L 5/005 |
| 2018/0138959 | A1* | 5/2018 | Chun | H04B 7/0626 |

FOREIGN PATENT DOCUMENTS

| | | |
|---|---|---|
| CN | 103460632 A | 12/2013 |
| CN | 103460632 B | 12/2013 |
| CN | 103686768 A | 3/2014 |
| KR | 2013012534 A | 11/2013 |
| KR | 20130125340 A | 11/2013 |
| WO | 2012070872 A1 | 5/2012 |
| WO | 2014107001 A1 | 7/2014 |

OTHER PUBLICATIONS 802.11ac—2013, IEEE Standard for Information technology—Telecommunications and information exchange between systemsLocal and metropolitan area networks—Specific requirements, Part 11: Wireless LAN Medium Access Control (MAC) and Physical Layer (PHY) SpecificationsAmendment 4: Enhancements for Very HighThroughput for Operation in Bands below 6 GHz, total 425 pages.

* cited by examiner

| Octets Quantity of bytes | 2 | 2 | 0 or 6 | 0 or 6 | 0 or 6 | 0 or 2 | 0 or 6 | 0 or 2 | 0 or 4 | Variable | 4 |
|---|---|---|---|---|---|---|---|---|---|---|---|
| | Frame control | Duration/ID Duration/ identifier | A1 Address 1 | A2 Address 2 | A3 Address 3 | Sequence control | A4 Address 4 | QoS control Quality of service control | HT control High throughput control | Frame body | FCS Frame check sequence |

FIG. 1

WLAN LINK ADAPTATION METHOD AND NETWORK DEVICE

CROSS-REFERENCE TO RELATED APPLICATIONS

This application is a continuation of International Application No. PCT/CN2015/082358, filed on Jun. 25, 2015, the disclosure of which is hereby incorporated by reference in its entirety.

TECHNICAL FIELD

The present application relates to the field of communications technologies, and in particular, to a WLAN link adaptation method and a network device.

BACKGROUND

In a wireless communications system, channel information in a radio channel varies over time because of factors such as a path loss, fading, or noises. For such a time-varying characteristic of a channel, a link adaptation technology is introduced. The link adaptation technology refers to a behavior that a system adaptively adjusts transmission parameters of the system according to currently obtained channel information, so as to overcome or adapt to effects brought about by a current channel change. It can be learned from basic principles of the link adaptation technology that the link adaptation technology mainly includes the following two aspects. One is channel information obtaining, that is, how to accurately and effectively obtain a current channel status. The other is adjustment of transmission parameters such as a modulation and coding scheme (MCS). Currently, the link adaptation technology, by virtue of its excellent performance in improving spectral efficiency and data transmission rates, becomes popular, is already successfully applied to various types of mobile communications systems, and becomes one of key technologies in improving system performance.

As the communications technologies develop rapidly, orthogonal frequency division multiple access (OFDMA) has been widely studied, and becomes a mainstream multiple access scheme for the downlink in the 3GPP Long Term Evolution (LTE). The OFDMA technology is mainly used to divide entire transmission bandwidth into a series of sub-carrier sets (sub-channel) that do not overlap and that are orthogonal to each other, and allocate different sub-channels to different users, so as to implement parallel data transmission for multiple users. In addition, the OFDMA technology will also be introduced into IEEE 802.11ax, a next generation wireless fidelity (WiFi) standard.

Currently, in a link adaptation process based on the IEEE 802.11 standard, for all users, channel information is measured over entire transmission bandwidth by default, and the channel information reflecting a channel status of the entire transmission bandwidth is used as reference to perform link adaptation adjustment. However, with introduction of the OFDMA technology, a sub-channel is used to perform data transmission for a user, and an existing link adaptation scheme cannot provide accurate link adaptation for all the users.

SUMMARY

Embodiments of the present application provide a WLAN link adaptation method and a network device, so as to provide accurate link adaptation for each user in an OFDMA communications system.

A first aspect of the embodiments of the present application provides a WLAN link adaptation method, including:

obtaining, by a first network device, a target channel information measurement result, where the target channel information measurement result is a measurement result obtained by measuring channel information over target bandwidth; and determining, by the first network device, a modulation and coding scheme MCS of a link according to the target channel information measurement result.

With reference to the first aspect of the embodiments of the present application, in a first implementation of the first aspect of the embodiments of the present application, the obtaining, by a first network device, a target channel information measurement result includes:

sending, by the first network device, a first physical layer protocol data unit PPDU to a second network device, where the first PPDU indicates that the second network device needs to send a channel information measurement result, and the first PPDU further includes a measurement bandwidth indication field, where the measurement bandwidth indication field is used to instruct the second network device to measure the channel information over the target bandwidth; and receiving, by the first network device, a second PPDU including the target channel information measurement result and sent by the second network device, where the target channel information measurement result is obtained by the second network device by measuring the channel information over the target bandwidth by using the first PPDU.

With reference to the first implementation of the first aspect of the embodiments of the present application, in a second implementation of the first aspect of the embodiments of the present application, the measurement bandwidth indication field includes a first indication field; and the first indication field is used to instruct the second network device to measure the channel information over entire transmission bandwidth; or the first indication field is used to instruct the second network device to measure the channel information over partial transmission bandwidth.

With reference to the first implementation of the first aspect of the embodiments of the present application, in a third implementation of the first aspect of the embodiments of the present application, the measurement bandwidth indication field includes a second indication field; and the second indication field is used to instruct the second network device to measure the channel information over a specified resource block.

With reference to the first aspect of the embodiments of the present application, in a fourth implementation of the first aspect of the embodiments of the present application, the obtaining, by a first network device, a target channel information measurement result includes:

receiving, by the first network device, a PPDU sent by a second network device, where the PPDU indicates that the second network device unsolicitedly sends a channel information measurement result, and the PPDU further includes a measurement bandwidth indication field, where the measurement bandwidth indication field is used to indicate bandwidth over which the second network device measures the channel information; and determining, by the first network device, the target channel information measurement result according to the measurement bandwidth indication field.

With reference to the fourth implementation of the first aspect of the embodiments of the present application, in a fifth implementation of the first aspect of the embodiments of the present application, the measurement bandwidth indication field includes a first indication field; and the first indication field is used to indicate that the second network device measures the channel information over entire transmission bandwidth; or the first indication field is used to indicate that the second network device measures the channel information over partial transmission bandwidth.

With reference to the fourth implementation of the first aspect of the embodiments of the present application, in a sixth implementation of the first aspect of the embodiments of the present application, the measurement bandwidth indication field includes a second indication field; and the second indication field is used to indicate a resource block or resource blocks over which the second network device measures the channel information.

With reference to the first aspect of the embodiments of the present application, in a seventh implementation of the first aspect of the embodiments of the present application, the obtaining, by a first network device, a target channel information measurement result includes:

sending, by the first network device, a first PPDU to a second network device, where the first PPDU indicates that the second network device needs to send a probe PPDU, and the first PPDU further includes a measurement bandwidth indication field, where the measurement bandwidth indication field is used to indicate that the first network device needs to measure the channel information over the target bandwidth;

receiving, by the first network device, a second PPDU, where the second PPDU is the probe PPDU generated by the second network device according to the measurement bandwidth indication field; and measuring, by the first network device, the channel information over the target bandwidth by using the second PPDU, to obtain the target channel information measurement result.

With reference to the seventh implementation of the first aspect of the embodiments of the present application, in an eighth implementation of the first aspect of the embodiments of the present application, the measurement bandwidth indication field includes a first indication field; and the first indication field is used to indicate that the first network device needs to measure the channel information over entire transmission bandwidth; or the first indication field is used to indicate that the first network device needs to measure the channel information over partial transmission bandwidth.

With reference to the seventh implementation of the first aspect of the embodiments of the present application, in a ninth implementation of the first aspect of the embodiments of the present application, the measurement bandwidth indication field includes a second indication field; and the second indication field is used to indicate that the first network device needs to measure the channel information over a specified resource block.

A second aspect of the embodiments of the present application provides a WLAN link adaptation method, including:

receiving, by a second network device, a first PPDU sent by a first network device, where the first PPDU indicates that the second network device needs to send a channel information measurement result, and the first PPDU further includes a measurement bandwidth indication field, where the measurement bandwidth indication field is used to instruct the second network device to measure channel information over target bandwidth;

measuring, by the second network device, the channel information over the target bandwidth by using the first PPDU, to obtain a channel information measurement result; and sending, by the second network device, a second PPDU including the channel information measurement result to the first network device, where the second PPDU is used by the first network device to determine an MCS of a link according to the channel information measurement result indicated by the second PPDU.

With reference to the second aspect of the embodiments of the present application, in a first implementation of the second aspect of the embodiments of the present application, the measurement bandwidth indication field includes a first indication field; and the first indication field is used to instruct the second network device to measure the channel information over entire transmission bandwidth; or the first indication field is used to instruct the second network device to measure the channel information over partial transmission bandwidth.

With reference to the second aspect of the embodiments of the present application, in a second implementation of the second aspect of the embodiments of the present application, the measurement bandwidth indication field includes a second indication field; and the second indication field is used to instruct the second network device to measure the channel information over a specified resource block.

A third aspect of the embodiments of the present application provides a WLAN link adaptation method, including:

generating, by a second network device, a PPDU, where the PPDU indicates that the second network device unsolicitedly sends a channel information measurement result, and the PPDU further includes a measurement bandwidth indication field, where the measurement bandwidth indication field is used to indicate bandwidth over which the second network device measures channel information; and sending, by the second network device, the PPDU to a first network device, where the PPDU is used by the first network device to determine a target channel information measurement result according to the measurement bandwidth indication field, and an MCS of a link is determined according to the target channel information measurement result.

With reference to the third aspect of the embodiments of the present application, in a first implementation of the third aspect of the embodiments of the present application, the measurement bandwidth indication field includes a first indication field; and the first indication field is used to indicate that the second network device measures the channel information over entire transmission bandwidth; or the first indication field is used to indicate that the second network device measures the channel information over partial transmission bandwidth.

With reference to the third aspect of the embodiments of the present application, in a second implementation of the third aspect of the embodiments of the present application, the measurement bandwidth indication field includes a second indication field; and the second indication field is used to indicate a resource block or resource blocks over which the second network device measures the channel information.

A fourth aspect of the embodiments of the present application provides a WLAN link adaptation method, including:

receiving, by a second network device, a first PPDU sent by a first network device, where the first PPDU indicates that the second network device needs to send a probe PPDU, and the first PPDU further includes a measurement bandwidth indication field, where the measurement bandwidth indication field is used to indicate that the first network device needs to measure channel information over target bandwidth;

generating, by the second network device, a second PPDU, where the second PPDU is the probe PPDU generated according to the measurement bandwidth indication field; and sending, by the second network device, the second PPDU to the first network device, where the second PPDU is used by the first network device to measure the channel information over the target bandwidth, and link adaptation adjustment is performed according to the channel information.

With reference to the fourth aspect of the embodiments of the present application, in a first implementation of the fourth aspect of the embodiments of the present application, the measurement bandwidth indication field includes a first indication field; and the first indication field is used to indicate that the first network device needs to measure the channel information over entire transmission bandwidth; or the first indication field is used to indicate that the first network device needs to measure the channel information over partial transmission bandwidth.

With reference to the fourth aspect of the embodiments of the present application, in a second implementation of the fourth aspect of the embodiments of the present application, the measurement bandwidth indication field includes a second indication field; and the second indication field is used to indicate that the first network device needs to measure the channel information over a specified resource block.

A fifth aspect of the embodiments of the present application provides a network device, including:

an obtaining unit, configured to obtain a target channel information measurement result, where the target channel information measurement result is a measurement result obtained by measuring channel information over target bandwidth; and a determining unit, configured to determine a modulation and coding scheme MCS of a link according to the target channel information measurement result.

With reference to the fifth aspect of the embodiments of the present application, in a first implementation of the fifth aspect of the embodiments of the present application, the obtaining unit includes:

a first sending module, configured to send a first physical layer protocol data unit PPDU to a target network device, where the first PPDU indicates that the target network device needs to send a channel information measurement result, and the first PPDU further includes a measurement bandwidth indication field, where the measurement bandwidth indication field is used to instruct the target network device to measure the channel information over the target bandwidth; and a first receiving module, configured to receive a second PPDU including the target channel information measurement result and sent by the target network device, where the target channel information measurement result is obtained by the target network device by measuring the channel information over the target bandwidth by using the first PPDU.

With reference to the first implementation of the fifth aspect of the embodiments of the present application, in a second implementation of the fifth aspect of the embodiments of the present application, the measurement bandwidth indication field includes a first indication field; and the first indication field is used to instruct the target network device to measure the channel information over entire transmission bandwidth; or the first indication field is used to instruct the target network device to measure the channel information over partial transmission bandwidth.

With reference to the first implementation of the fifth aspect of the embodiments of the present application, in a third implementation of the fifth aspect of the embodiments of the present application, the measurement bandwidth indication field includes a second indication field; and the second indication field is used to instruct the target network device to measure the channel information over a specified resource block.

With reference to the fifth aspect of the embodiments of the present application, in a fourth implementation of the fifth aspect of the embodiments of the present application, the obtaining unit includes:

a second receiving module, configured to receive a PPDU sent by a target network device, where the PPDU indicates that the target network device unsolicitedly sends a channel information measurement result, and the PPDU further includes a measurement bandwidth indication field, where the measurement bandwidth indication field is used to indicate bandwidth over which the target network device measures the channel information; and a determining module, configured to determine the target channel information measurement result according to the measurement bandwidth indication field.

With reference to the fourth implementation of the fifth aspect of the embodiments of the present application, in a fifth implementation of the fifth aspect of the embodiments of the present application, the measurement bandwidth indication field includes a first indication field; and the first indication field is used to indicate that the target network device measures the channel information over entire transmission bandwidth; or the first indication field is used to indicate that the target network device measures the channel information over partial transmission bandwidth.

With reference to the fourth implementation of the fifth aspect of the embodiments of the present application, in a sixth implementation of the fifth aspect of the embodiments of the present application, the measurement bandwidth indication field includes a second indication field; and the second indication field is used to indicate a resource block or resource blocks over which the target network device measures the channel information.

With reference to the fifth aspect of the embodiments of the present application, in a seventh implementation of the fifth aspect of the embodiments of the present application, the obtaining unit includes:

a second sending module, configured to send a first PPDU to a target network device, where the first PPDU indicates that the target network device needs to send a probe PPDU, and the first PPDU further includes a measurement bandwidth indication field, where the measurement bandwidth indication field is used to indicate that the network device needs to measure the channel information over the target bandwidth;

a third receiving module, configured to receive a second PPDU, where the second PPDU is the probe PPDU generated by the target network device according to the measurement bandwidth indication field; and a measurement module, configured to measure the channel information over the target bandwidth by using the second PPDU, to obtain the target channel information measurement result.

With reference to the seventh implementation of the fifth aspect of the embodiments of the present application, in an eighth implementation of the fifth aspect of the embodiments of the present application, the measurement bandwidth indication field includes a first indication field; and the first indication field is used to indicate that the network device needs to measure the channel information over entire transmission bandwidth; or the first indication field is used to indicate that the network device needs to measure the channel information over partial transmission bandwidth.

With reference to the seventh implementation of the fifth aspect of the embodiments of the present application, in a ninth implementation of the fifth aspect of the embodiments of the present application, the measurement bandwidth indication field includes a second indication field; and the second indication field is used to indicate that the network device needs to measure the channel information over a specified resource block.

A sixth aspect of the embodiments of the present application provides a network device, including:

a receiving unit, configured to receive a first PPDU sent by a target network device, where the first PPDU indicates that the network device needs to send a channel information measurement result, and the first PPDU further includes a measurement bandwidth indication field, where the measurement bandwidth indication field is used to instruct the network device to measure channel information over target bandwidth;

a measurement unit, configured to measure the channel information over the target bandwidth by using the first PPDU, to obtain a channel information measurement result; and a sending unit, configured to send, to the target network device, a second PPDU including the channel information measurement result, where the second PPDU is used by the target network device to determine an MCS of a link according to the channel information measurement result indicated by the second PPDU.

With reference to the sixth aspect of the embodiments of the present application, in a first implementation of the sixth aspect of the embodiments of the present application, the measurement bandwidth indication field includes a first indication field; and the first indication field is used to instruct the network device to measure the channel information over entire transmission bandwidth; or the first indication field is used to instruct the network device to measure the channel information over partial transmission bandwidth.

With reference to the sixth aspect of the embodiments of the present application, in a second implementation of the sixth aspect of the embodiments of the present application, the measurement bandwidth indication field includes a second indication field; and the second indication field is used to instruct the network device to measure the channel information over a specified resource block.

A seventh aspect of the embodiments of the present application provides a network device, including:

a generation unit, configured to generate a PPDU, where the PPDU indicates that the network device unsolicitedly sends a channel information measurement result, and the PPDU further includes a measurement bandwidth indication field, where the measurement bandwidth indication field is used to indicate bandwidth over which the network device measures channel information; and a sending unit, configured to send the PPDU to a target network device, where the PPDU is used by the target network device to determine a target channel information measurement result according to the measurement bandwidth indication field, and an MCS of a link is determined according to the target channel information measurement result.

With reference to the seventh aspect of the embodiments of the present application, in a first implementation of the seventh aspect of the embodiments of the present application, the measurement bandwidth indication field includes a first indication field; and the first indication field is used to indicate that the network device measures the channel information over entire transmission bandwidth; or the first indication field is used to indicate that the network device measures the channel information over partial transmission bandwidth.

With reference to the seventh aspect of the embodiments of the present application, in a second implementation of the seventh aspect of the embodiments of the present application, the measurement bandwidth indication field includes a second indication field; and the second indication field is used to indicate a resource block or resource blocks over which the network device measures the channel information.

An eighth aspect of the embodiments of the present application provides a network device, including:

a receiving unit, configured to receive a first PPDU sent by a target network device, where the first PPDU indicates that the network device needs to send a probe PPDU, and the first PPDU further includes a measurement bandwidth indication field, where the measurement bandwidth indication field is used to indicate that the network device needs to measure channel information over target bandwidth;

a generation unit, configured to generate a second PPDU, where the second PPDU is the probe PPDU generated according to the measurement bandwidth indication field; and a sending unit, configured to send the second PPDU to the target network device, where the second PPDU is used by the target network device to measure the channel information over the target bandwidth, and link adaptation adjustment is performed according to the channel information.

With reference to the eighth aspect of the embodiments of the present application, in a first implementation of the eighth aspect of the embodiments of the present application, the measurement bandwidth indication field includes a first indication field; and the first indication field is used to indicate that the target network device needs to measure the channel information over entire transmission bandwidth; or the first indication field is used to indicate that the target network device needs to measure the channel information over partial transmission bandwidth.

With reference to the eighth aspect of the embodiments of the present application, in a second implementation of the eighth aspect of the embodiments of the present application, the measurement bandwidth indication field includes a second indication field; and the second indication field is used to indicate that the target network device needs to measure the channel information over a specified resource block.

In the technical solutions provided in the embodiments of the present application, the first network device obtains a target channel information measurement result, where the target channel information measurement result is a measurement result obtained by measuring channel information over target bandwidth; and determines a modulation and coding scheme MCS of a link according to the target channel information measurement result. Therefore, in comparison with the prior art in which link adaptation adjustment is performed by default according to a channel information result measured over entire transmission bandwidth, in the embodiments of the present application, a channel information measurement result of particular bandwidth can be flexibly obtained, and link adaptation adjustment is performed according to a corresponding channel information result, so as to provide accurate link adaptation for each user in an OFDMA communications system.

BRIEF DESCRIPTION OF DRAWINGS

FIG. 1 is a schematic diagram of a format of a MAC frame in the IEEE 802.11n standard;

DESCRIPTION OF EMBODIMENTS

The embodiments of the present application provide a WLAN link adaptation method and a network device, so as to provide accurate link adaptation for different users in an OFDMA communications system. Detailed descriptions are provided below.

The following clearly and completely describes the technical solutions in the embodiments of the present application with reference to the accompanying drawings in the embodiments of the present application. Apparently, the described embodiments are merely some but not all of the embodiments of the present application. All other embodiments obtained by a person skilled in the art based on the embodiments of the present application without creative efforts shall fall within the protection scope of the present application.

It should be noted that the embodiments of the present application are applied to an OFDMA communications system in a wireless local area network. The OFDMA communications system includes a first network device and at least one second network device. The at least one second network devices are communicatively connected to the first network device in a wireless manner.

For example, the first network device may be an access point (AP) (and the second network device is a station (STA), or the first network device may be a STA, and the second network device is an AP.

It should be noted that in the following embodiments, adaptation of only a link between an AP and a STA is used as a specific application scenario to describe principles and implementations of the present application.

For ease of understanding the embodiments of the present application, the following describes related technologies or terms introduced in descriptions of the embodiments of the present application.

1. High Throughput Control Field

An AP or a STA performs link adaptation according to an high throughput (HT) control field of an Medium Access Control protocol data unit (MPDU).

As shown in FIG. 1, FIG. 1 is a schematic diagram of a format of a MAC frame in the IEEE 802.11n standard. An HT control field is included in a frame header of the MAC frame, and is used to indicate information such as link adaptation and a calibration position. The HT control field is generally in a control wrapper (Control Wrapper) frame, or is in a QoS data frame when a sequence bit of a frame control field is set to 1.

The following briefly describes formats of the HT control field in some existing standards, for example, an HT-variant HT control field in the IEEE 802.11n standard and a very high throughput (VHT)-variant HT control field in the IEEE 802.11ac standard.

Figure 2:
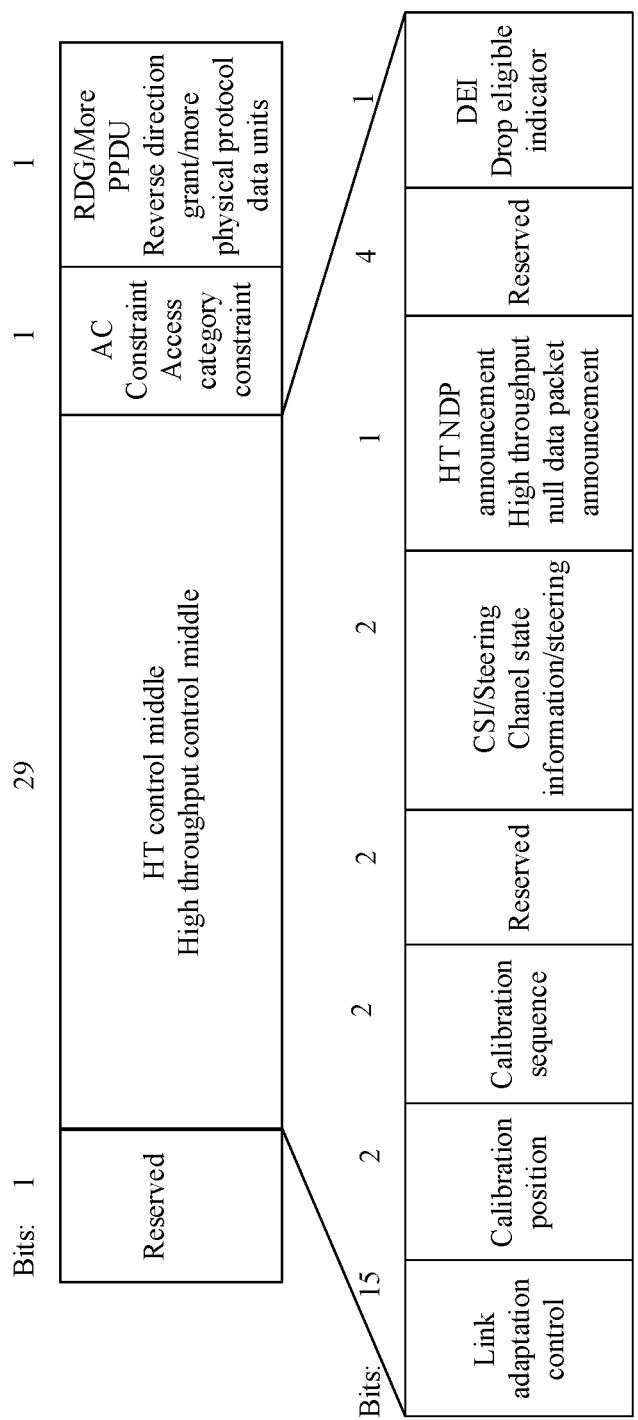
FIG. 2 is a schematic diagram of a format of an HT control field in the IEEE 802.11n standard.
Figure 3:
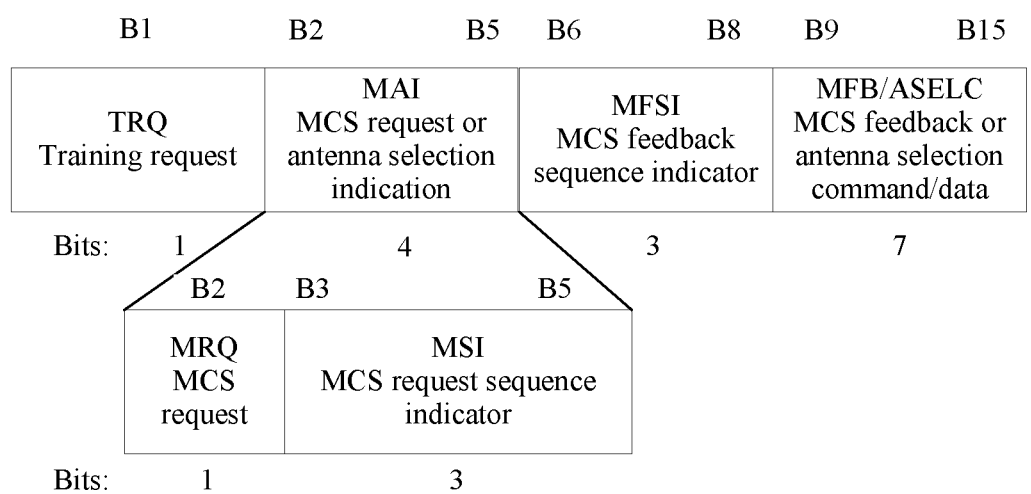
FIG. 3 is a schematic diagram of a format of a link adaptation control field in FIG. 2.

As shown in FIG. 2, FIG. 2 is a schematic diagram of a format of an HT control field (that is, an HT-variant HT control field) in the IEEE 802.11n standard. A link adaptation control field of the HT control field in FIG. 2 is used to indicate information related to link adaptation. For details, reference may be made to FIG. 3, and FIG. 3 is a schematic diagram of a format of a link adaptation control field.

The following briefly describes one of link adaptation procedures in the IEEE 802.11n standard: A link adaptation requesting end sends a physical layer protocol data unit (PPDU) including the HT-variant HT control field to a responding end, where a TRQ is set to 1 to indicate that the responding end needs to send one probe PPDU; the responder generates a probe PPDU according to the HT-variant HT control field and sends the probe PPDU to the link adaptation requesting end; and the link adaptation requesting end measures channel information according to the probe PPDU and performs link adaptation adjustment according to the channel information.

Figure 4:
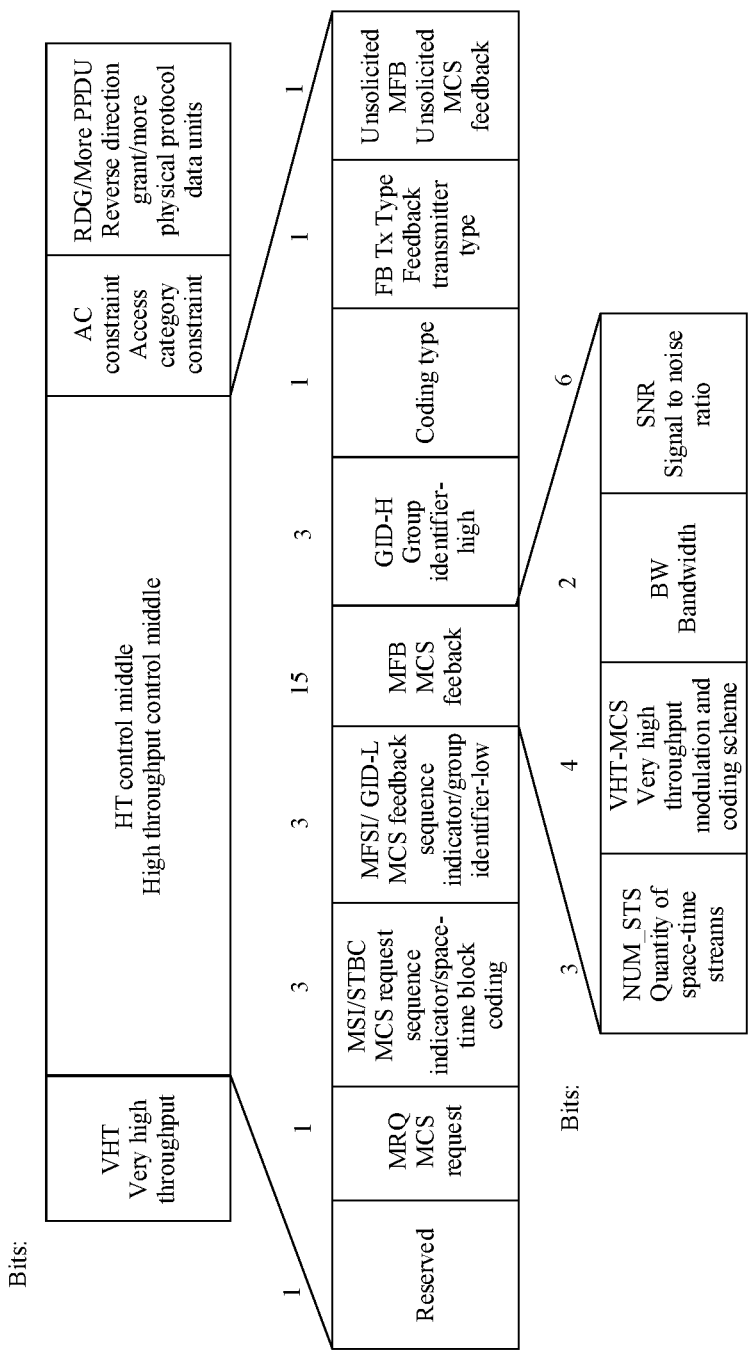
FIG. 4 is a schematic diagram of a format of an HT control field in the IEEE 802.11ac standard.

On the basis of the IEEE 802.11n standard, the VHT-variant HT control field is more comprehensively designed in the IEEE 802.11ac standard. As shown in FIG. 4, FIG. 4 is a schematic diagram of a format of an HT control field (that is, the VHT-variant HT control field) in the IEEE 802.11ac standard. A VHT-variant HT control field reuses the HT-variant HT control field, where the first bit, previously used as a reserved bit, of the HT-variant HT control field is used as a VHT bit, and the VHT bit is used to differentiate the two versions. When the VHT bit is set to 0, it indicates that a current HT control field is an HT-variant HT control field; when the VHT bit is set to 1, it indicates that a current HT control field is a VHT-variant HT control field.

The following briefly describes two link adaptation procedures in the IEEE 802.11ac standard, including a solicited feedback mechanism and an unsolicited feedback mechanism.

In a link adaptation procedure in the solicited feedback mechanism, a link adaptation requesting end sends a probe PPDU to a responding end, where a VHT is set to 1 to indicate that a current HT control field is a VHT-variant HT control field, and the VHT is set to 1 and an MRQ (MCS request) is set to 1 to indicate that the responding end needs to perform MCS feedback; and the responding end uses the probe PPDU to measure channel information, and feeds back a channel information measurement result to the link adaptation requesting end, so that the link adaptation requesting end performs link adaptation adjustment according to the channel information measurement result.

The unsolicited feedback mechanism means that when a communication peer end does not send a feedback request, a proactive feedback end unsolicitedly feeds back a channel information measurement result for data of any one or more frames that are previously sent by the communication peer end. In a link adaptation procedure in the unsolicited feedback mechanism, the proactive feedback end unsolicitedly sends a PPDU including the VHT-variant HT control field to the communication peer end, where a VHT is set to 1 to indicate that a current HT control field is a VHT-variant HT control field, and an unsolicited MFB (Unsolicited MCS feedback indicator, unsolicited MCS feedback indicator) is set to 1 to indicate that MCS feedback is unsolicited proactive feedback. The proactive feedback end adds a corresponding channel information measurement result to an MCS feedback (MFB) field, so that the communication peer performs link adaptation adjustment according to the channel information measurement result.

It should be noted that some common information, such as an MCS request sequence indicator/space time block code (MSI/STBC) field, in the HT control field is not described herein. A person skilled in the art may refer to specifications in existing related standards and subsequent related standards.

2. Link Adaptation

In this embodiment, a parameter adjusted in link adaptation may include at least one of parameters such as a modulation scheme, a coding scheme, redundancy information, transmit power, and a time-frequency resource. In this embodiment, a channel parameter used to measure channel information, such as a channel signal to noise ratio (SNR) or a channel extension delay, may be determined according to a parameter adjusted in link adaptation. Accordingly, in link adaptation processes of the solicited feedback mechanism and the unsolicited feedback mechanism, channel information measurement results obtained in measuring channel information also include multiple types of content, such as an MCS and antenna selection.

MCS link adaptation is used as an example, that is, when the parameter adjusted in link adaptation is an MCS, channel information may include a channel SNR, and a corresponding channel information measurement result may include a recommended space-time stream quantity, a recommended MCS, bandwidth used for the recommended MCS, an average efficient SNR, and the like. It should be noted that in some embodiments below, the MCS link adaptation is mainly used as a specific application scenario to describe the principles and the implementations of the present application.

Figure 5:
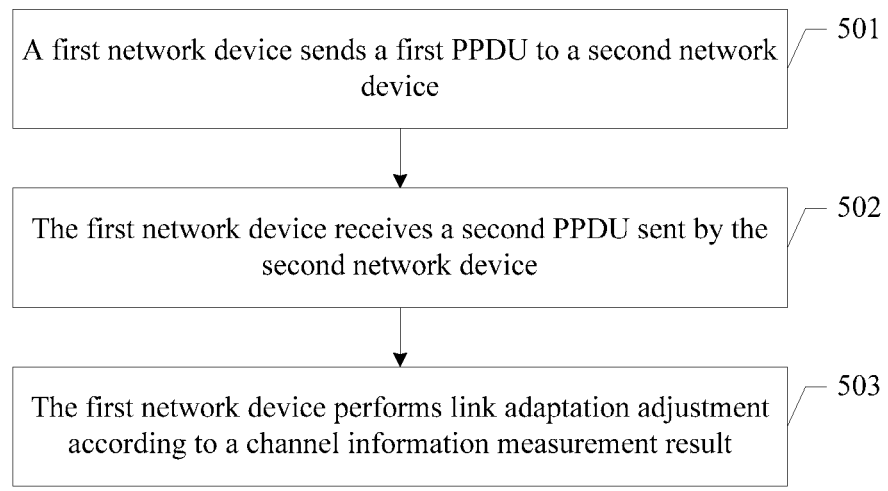
FIG. 5 is a schematic diagram of an embodiment of a WLAN link adaptation method according to the embodiments of the present application.

The following describes link adaptation procedure in a solicited feedback mechanism from the perspective of a first network device. Referring to FIG. 5, an embodiment of a WLAN link adaptation method in the embodiments of the present application includes the following steps.

501. The first network device sends a first PPDU to a second network device.

In this embodiment, the first PPDU indicates that the second network device needs to send a channel information measurement result, to indicate that link adaptation in the solicited feedback mechanism is to be performed. It may be understood that in an actual application process, the first PPDU may indicate, by using its preamble field or its carried MPDU, that the second network device needs to send the channel information measurement result, and no specific limitation is set herein.

In this embodiment, the first PPDU further includes a measurement bandwidth indication field, and the measurement bandwidth indication field is used to instruct the second network device to measure channel information over target bandwidth. It may be understood that in an actual application process, the measurement bandwidth indication field may be included in the preamble field (for example, an HE-SIG-B field) of the first PPDU, or may be included in the MPDU of the first PPDU, and no specific limitation is set herein.

The following describes in detail how the measurement bandwidth indication field indicates bandwidth over which the channel information is measured by using different examples.

Optionally, in this embodiment, the measurement bandwidth indication field may include a first indication field. The first indication field is used to instruct the second network device to measure the channel information over entire transmission bandwidth or partial transmission bandwidth.

Optionally, in this embodiment, the measurement bandwidth indication field may include a second indication field. The second indication field is used to instruct the second network device to measure the channel information over a specified resource block. In this embodiment, there may be one or more resource blocks. Therefore, optionally, the second indication field may include a first field. The first field includes a first sub-field, and the first sub-field is used to indicate a resource block over which the second network device is to measure the channel information. Preferably, a type of the resource block may be further indicated herein, so as to determine whether the resource block is obtained by division based on entire transmission bandwidth or based on partial transmission bandwidth. Therefore, the first field may further include a second sub-field, and the second sub-field is used to indicate whether the resource block is a first resource block or a second resource block. The first resource block is a resource block obtained by resource division based on entire transmission bandwidth, and the second resource block is a resource block obtained by resource division based on partial transmission bandwidth. Alternatively, optionally, in this embodiment, the second indication field may include a second field, and the second field includes a third sub-field. The third sub-field is used to indicate resource blocks over which the second network device is to measure the channel information. Likewise, preferably, a type of the resource block may be further indicated herein, so as to determine whether the resource block is obtained by division based on entire transmission bandwidth or based on partial transmission bandwidth. Therefore, the second field may further include a fourth sub-field, and the fourth sub-field is used to indicate whether the resource block is a first resource block or a second resource block. The first resource block is a resource block obtained by resource division based on entire transmission bandwidth, and the second resource block is a resource block obtained by resource division based on partial transmission bandwidth.

It may be understood that in an actual application process, the foregoing indication manners may be used jointly, or another indication manner may be used, and no specific limitation is set herein.

In this embodiment, the partial transmission bandwidth refers to several specified sub-channels. For example, the partial transmission bandwidth may refer to sub-channels that the first network device currently allocates to the second network device.

502. The first network device receives a second PPDU sent by the second network device.

In this embodiment, after receiving the first PPDU, the second network device measures the channel information over the target bandwidth by using the first PPDU, to obtain the channel information measurement result, and sends the second PPDU to the first network device to feed back the channel information measurement result to the first network device.

503. The first network device performs link adaptation adjustment according to a channel information measurement result.

In this embodiment, after receiving the second PPDU, the first network device reads the channel information measurement result from the second PPDU, and performs link adaptation adjustment according to the channel information measurement result. For example, MCS link adaptation adjustment is performed according to a recommended space-time stream quantity, a recommended MCS, bandwidth used for the recommended MCS, an average efficient SNR, and the like. It may be understood that the channel information measurement result may further include other content. A person skilled in the art may introduce a required parameter according to a practical application scenario, and no specific limitation is set herein.

In the technical solution provided in this embodiment of the present application, a first network device sends a first PPDU to a second network device, the first PPDU indicates that the second network device needs to send a channel information measurement result, the first PPDU further includes a measurement bandwidth indication field, and the measurement bandwidth indication field is used to instruct the second network device to measure channel information over target bandwidth. The first network device receives a second PPDU including the channel information measurement result and sent by the second network device, where the second network device measures the channel information over the target bandwidth to obtain the channel information measurement result. The first network device performs link adaptation adjustment according to the channel information measurement result. Therefore, in comparison with the prior art, in this embodiment of the present application, a measurement bandwidth indication field is further carried in a PPDU to specify bandwidth over which channel information is to be measured, so as to obtain a channel information measurement result that can reflect a channel status of the specified bandwidth. Therefore, in comparison with the prior art in which link adaptation adjustment is performed by default according to a channel information result measured over entire transmission bandwidth, in this embodiment of the present application, bandwidth over which channel information is to be measured can be flexibly specified, and link adaptation adjustment is performed according to a corresponding channel information result, so as to provide accurate link adaptation for each user in an OFDMA communications system.

Figure 6:
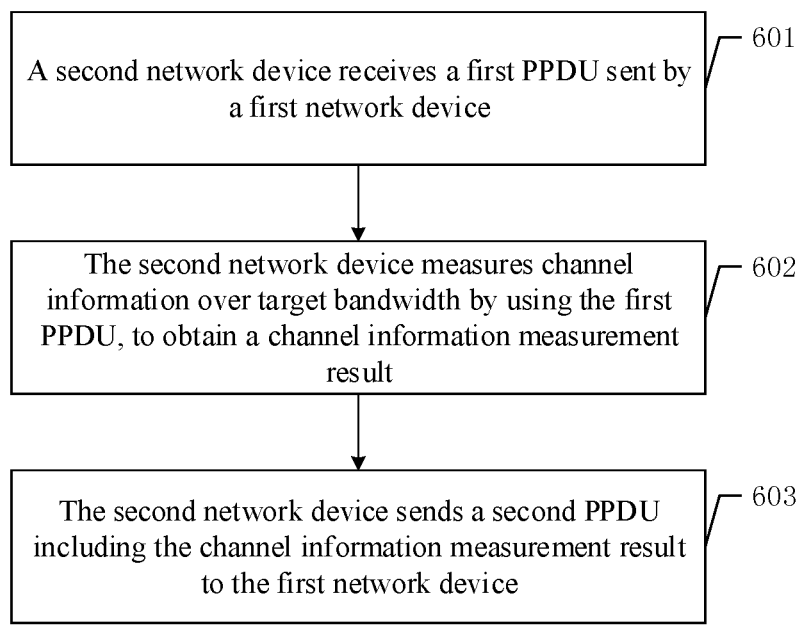
FIG. 6 is a schematic diagram of another embodiment of a WLAN link adaptation method according to the embodiments of the present application.

The following describes a link adaptation procedure in a solicited feedback mechanism from the perspective of a second network device. Referring to FIG. 6, another embodiment of a WLAN link adaptation method in the embodiments of the present application includes the following steps.

601. The second network device receives a first PPDU sent by a first network device.

In this embodiment, the first PPDU indicates that the second network device needs to send a channel information measurement result, to indicate that link adaptation in the solicited feedback mechanism is to be performed. It may be understood that in an actual application process, the first PPDU may indicate, by using its preamble field or its carried MPDU, that the second network device needs to send the channel information measurement result, and no specific limitation is set herein.

In this embodiment, the first PPDU further includes a measurement bandwidth indication field, and the measurement bandwidth indication field is used to instruct the second network device to measure channel information over target bandwidth. It may be understood that in an actual application process, the measurement bandwidth indication field may be included in the preamble field (for example, an HE-SIG-B field) of the first PPDU, or may be included in the MPDU of the first PPDU, and no specific limitation is set herein.

Herein, for descriptions of the measurement bandwidth indication field, reference may be made to step 501 in the embodiment shown in FIG. 5, and details are not described herein again.

602. The second network device measures channel information over target bandwidth by using the first PPDU, to obtain a channel information measurement result.

In this embodiment, after receiving the first PPDU, the second network device measures the channel information over the target bandwidth by using the first PPDU, to obtain the channel information measurement result. For descriptions of the channel information measurement result, reference may be made to the descriptions in step 503 in the embodiment shown in FIG. 5, and details are not described herein again.

603. The second network device sends a second PPDU including the channel information measurement result to the first network device.

In this embodiment, the second PPDU is used by the first network device to perform link adaptation adjustment according to the channel information measurement result indicated by the second PPDU.

In the technical solution provided in this embodiment of the present application, a second network device receives a first PPDU sent by a first network device, the first PPDU indicates that the second network device needs to send a channel information measurement result, the first PPDU further includes a measurement bandwidth indication field, and the measurement bandwidth indication field is used to instruct the second network device to measure channel information over target bandwidth. The second network device measures the channel information over the target bandwidth by using the first PPDU, to obtain the channel information measurement result. The second network device sends a second PPDU including the channel information measurement result to the first network device, where the second PPDU is used by the first network device to perform link adaptation adjustment according to the channel information measurement result indicated by the second PPDU. Therefore, in comparison with the prior art, in this embodiment of the present application, a measurement bandwidth indication field is further carried in a PPDU to specify bandwidth over which channel information is to be measured, so as to obtain a channel information measurement result that can reflect a channel status of the specified bandwidth. Therefore, in comparison with the prior art in which link adaptation adjustment is performed by default according to a channel information result measured over entire transmission bandwidth, in this embodiment of the present application, bandwidth over which channel information is to be measured can be flexibly specified, and link adaptation adjustment is performed according to a corresponding channel information result, so as to provide accurate link adaptation for each user in an OFDMA communications system.

Figure 7:
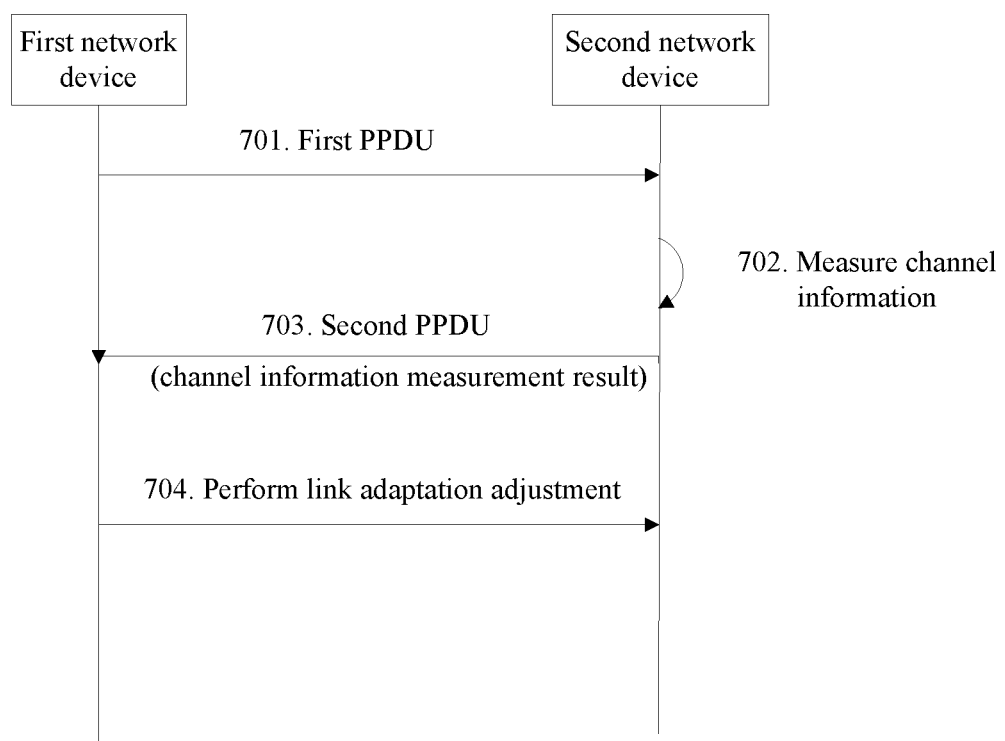
FIG. 7 is a schematic diagram of a WLAN link adaptation method according to the embodiments of the present application.

Based on the embodiments shown in FIG. 5 and FIG. 6, the following describes in detail a WLAN link adaptation method in the solicited feedback mechanism by using an example in which the measurement bandwidth indication field is included in an HT control field of the first PPDU. Referring to FIG. 7, another embodiment of a WLAN link adaptation method in the embodiments of the present application includes the following steps.

701. A first network device sends a first PPDU to a second network device.

In this embodiment, the first PPDU carries at least one first MPDU, and the first MPDU indicates that the second network device needs to send a channel information measurement result, to indicate that link adaptation in the solicited feedback mechanism is to be performed.

In this embodiment, the first MPDU includes an HT control field, and the HT control field further includes a measurement bandwidth indication field. The measurement bandwidth indication field is used to instruct the second network device to measure channel information over target bandwidth.

Optionally, in this embodiment, the first MPDU may include a control wrapper (Control Wrapper) frame, a QoS data frame when a sequence bit of a frame control field is set to 1, a beacon (Beacon) frame, a probe response (Probe response) frame, or the like. In an actual application process, the first MPDU may further include some frames of other types, provided that these frames carry link adaptation capability information. No specific limitation is set herein on a frame type of the first MPDU.

702. The second network device measures channel information over target bandwidth by using the first PPDU, to obtain a channel information measurement result.

703. The second network device sends a second PPDU including the channel information measurement result to the first network device.

Step 702 and step 703 in this embodiment are the same as step 602 and step 603 in the embodiment shown in FIG. 6, and details are not described herein again.

704. The first network device performs link adaptation adjustment according to the channel information measurement result.

Step 704 in this embodiment is the same as step 503 in the embodiment shown in FIG. 5, and details are not described herein again.

In the technical solution provided in this embodiment of the present application, a first network device sends, to a second network device, a first PPDU carrying at least one first MPDU, the first MPDU indicates that the second network device needs to send a channel information measurement result, an HT control field of the first MPDU further includes a measurement bandwidth indication field, and the measurement bandwidth indication field is used to instruct the second network device to measure channel information over target bandwidth. The first network device receives a second PPDU including the channel information measurement result and sent by the second network device, where the second network device measures the channel information over the target bandwidth to obtain the channel information measurement result. The first network device performs link adaptation adjustment according to the channel information measurement result. Therefore, in comparison with the prior art, in this embodiment of the present application, a measurement bandwidth indication field is further carried in an HT control field to specify bandwidth over which channel information is to be measured, so as to obtain a channel information measurement result that can reflect a channel status of the specified bandwidth. Therefore, in comparison with the prior art in which link adaptation adjustment is performed by default according to a channel information result measured over entire transmission bandwidth, in this embodiment of the present application, bandwidth over which channel information is to be measured can be flexibly specified, and link adaptation adjustment is performed according to a corresponding channel information result, so as to provide accurate link adaptation for each user in an OFDMA communications system.

Based on the embodiment shown in FIG. 7, the following describes in detail a specific format of the measurement bandwidth indication field by using different examples.

It should be noted that in this embodiment, a new version identification field may be added to the MPDU in this embodiment of the present application, and is denoted, for example, as an HE bit. Therefore, the HT control field in this embodiment of the present application may be understood as an HE-variant HT control field. In an actual application process, to implement version downward compatibility, on the basis of a VHT-variant HT control field, the HE bit is provided at a bit location following the VHT bit. It may be understood that in some particular application scenarios, the version identification field may not be included.

1. First Indication Field

Optionally, in this embodiment, the measurement bandwidth indication field may include a first indication field. The first indication field is used to instruct the second network device to measure the channel information over entire transmission bandwidth or partial transmission bandwidth. That is, the first indication field uses the entire transmission bandwidth or the partial transmission bandwidth as the target bandwidth, and instructs the second network device to measure the channel information over the corresponding target bandwidth.

In this embodiment, no limitation is set on a specific location and a bit quantity of the first indication field. For example, in this embodiment, the first indication field may include one bit, which is denoted, for example, as a full/sub-channel (Full Channel or Sub-channel indication, full channel or sub-channel indication) bit. When the full/sub-channel bit is set to 1, the second network device is instructed to measure the channel information over the partial transmission bandwidth. When the full/sub-channel bit is set to 0, the second network device is instructed to measure the channel information over the entire transmission bandwidth.

For example, in this embodiment, the full/sub-channel bit may reuse an original field, to reduce additional overheads. For example, for the VHT-variant HT control field, in a link adaptation process of the solicited feedback mechanism in this embodiment of the present application, a BW field, a GID-H field, a coding type field, and an FB Tx type field in FIG. 4 are all reserved bits. Therefore, in a schematic diagram of a format of an HT control field shown in FIG. 8, the full/sub-channel bit may be included in any one of the reserved bits of the HT control field. For another example, after the HE bit is introduced, the first indication field reuses the HE bit. When the HE bit is set to 1, the second network device is instructed to measure the channel information over the partial transmission bandwidth. When the HE bit is set to 0, the second network device is instructed to measure the channel information over the entire transmission bandwidth.

Therefore, in this embodiment, a first indication field of an HT control field may be used to flexibly instruct a second network device to measure channel information over entire transmission bandwidth or any sub-channel. Therefore, a channel information measurement result that can reflect a channel status of the entire transmission bandwidth or a channel status of any sub-channel can be obtained, so as to provide accurate link adaptation for each user in an OFDMA communications system, including selecting a desired sub-channel and space-time stream, and the like for each second network device. In this way, system efficiency and a system throughput are improved.

2. Second Indication Field

The second indication field includes a first field or a second field, and details are provided below.

(1) First Field

Optionally, in this embodiment, the measurement bandwidth indication field may include a first field. The first field includes a first sub-field, and the first sub-field is used to indicate a resource block over which the second network device is to measure the channel information. That is, the first field uses which resource block as the target bandwidth, so as to instruct the second network device to measure the channel information over the corresponding target bandwidth.

Figure 9:
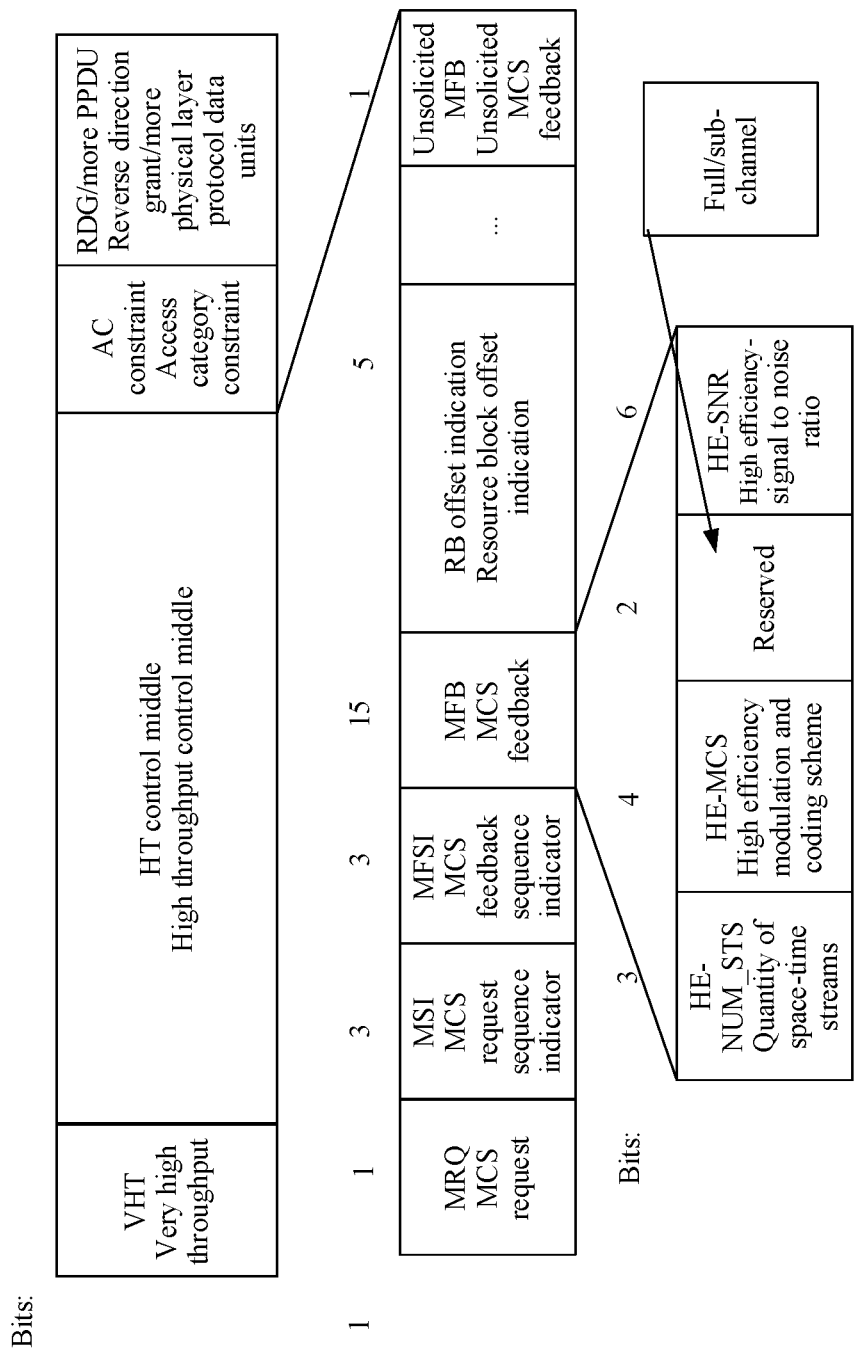
FIG. 9 is a schematic diagram of another format of an HT control field according to an embodiment of the present application.

In this embodiment, no limitation is set on a specific location and a bit quantity of the first sub-field. For example, in this embodiment, the first sub-field may be denoted as an RB offset indication (Resource block Offset Indication, resource block offset indication) field. For details, reference may be made to FIG. 9, which is a schematic diagram of another format of an HT control field according to an embodiment of the present application. In an actual application process, a bit quantity of the RB offset indication field may be determined by a quantity of resource blocks. For example, 4 second resource blocks are obtained by means of division based on partial transmission bandwidth, and the RB offset indication field may use three bits to specify which resource block over which the channel information is to be measured. For example, when the RB offset indication field is set to 001, it indicates that the channel information is to be measured over the first resource block.

Preferably, a type of the resource block may be further indicated herein, so as to determine whether the resource block is obtained by division based on entire transmission bandwidth or based on partial transmission bandwidth. Therefore, the first field may further include a second sub-field, and the second sub-field is used to indicate whether the resource block is a first resource block or a second resource block. The first resource block is a resource block obtained by resource division based on entire transmission bandwidth, and the second resource block is a resource block obtained by resource division based on partial transmission bandwidth. In this case, the first field may be used to instruct the second network device to measure the channel information over a first resource block or a second resource block. That is, the second indication field uses a first resource block or a second resource block as the target bandwidth, so as to instruct the second network device to measure the channel information over the corresponding target bandwidth.

It should be noted that in this embodiment, resource division is performed on the entire transmission bandwidth or the partial transmission bandwidth according to a preset resource division rule to obtain multiple resource blocks, and no specific limitation is set on the resource division rule herein. For example, the entire transmission bandwidth is 40M, and resource division is performed on the 40M to obtain nine 52-subcarrier resource blocks, that is, 9 first resource blocks. For another example, bandwidth of the partial transmission bandwidth is 20M, and resource division is performed on the 20M to obtain nine 26-subcarrier resource blocks, that is, 9 second resource blocks. In this embodiment, no limitation is set on a quantity and a size of resource blocks obtained after division. In an actual application process, an OFDMA communications system may store in advance multiple resource division rules, and multiple resource blocks of different resource block sizes may be obtained according to different resource division rules. Therefore, a field that is used to indicate a resource block size may be further introduced in the first MPDU, and is denoted, for example, as an RB size (Resource block size, resource block size) field. For example, the RB size field may indicate that the first resource block includes 52 subcarriers, or indicate that the first resource block includes 26 subcarriers.

In this embodiment, no limitation is set on a specific location and a bit quantity of the second sub-field. For example, in this embodiment, the second sub-field may include one bit, and is denoted as a full/sub-channel bit. When the full/sub-channel bit is set to 1, it indicates that the resource block is a first resource block. When the full/sub-channel bit is set to 0, it indicates that the resource block is a second resource block. Preferably, for a bit location of the second sub-field, reference may be made to the description of the first indication field, including reusing a reserved bit, reusing an HE bit, implication, or the like, and details are not described herein again. It may be understood that in an actual application process, the second sub-field may be used with the first indication field, and the first indication field may be reused as the second sub-field.

Optionally, in this embodiment, the first field may be further used to instruct the second network device to measure the channel information over the entire transmission bandwidth or the partial transmission bandwidth. For example, if the first sub-field is set to 0, or the first sub-field instructs to measure the channel information over the $N^{th}$ resource block, and N is greater than a total quantity of resource blocks, the target bandwidth is indicated based only on the second sub-field. This means that the second network device is instructed to measure the channel information over all resource blocks. When the full/sub-channel bit is set to 1, the second network device is instructed to measure the channel information over the partial transmission bandwidth. When the full/sub-channel bit is set to 0, the second network device is instructed to measure the channel information over the entire transmission bandwidth.

Therefore, in this embodiment, a first field of an HT control field may be used to flexibly instruct a second network device to measure channel information over any resource block. Therefore, a channel information measurement result that can reflect a channel status of any resource block can be obtained, so as to provide accurate link adaptation for each user in an OFDMA communications system.

(2) Second Field

Optionally, in this embodiment, the measurement bandwidth indication field may include a second field, and the second field includes a third sub-field. The third sub-field is used to indicate resource blocks over which the second network device is to measure the channel information. That is, the second field uses multiple particular resource blocks as the target bandwidth, so as to instruct the second network device to measure the channel information over the corresponding multiple resource blocks.

Figure 10A:
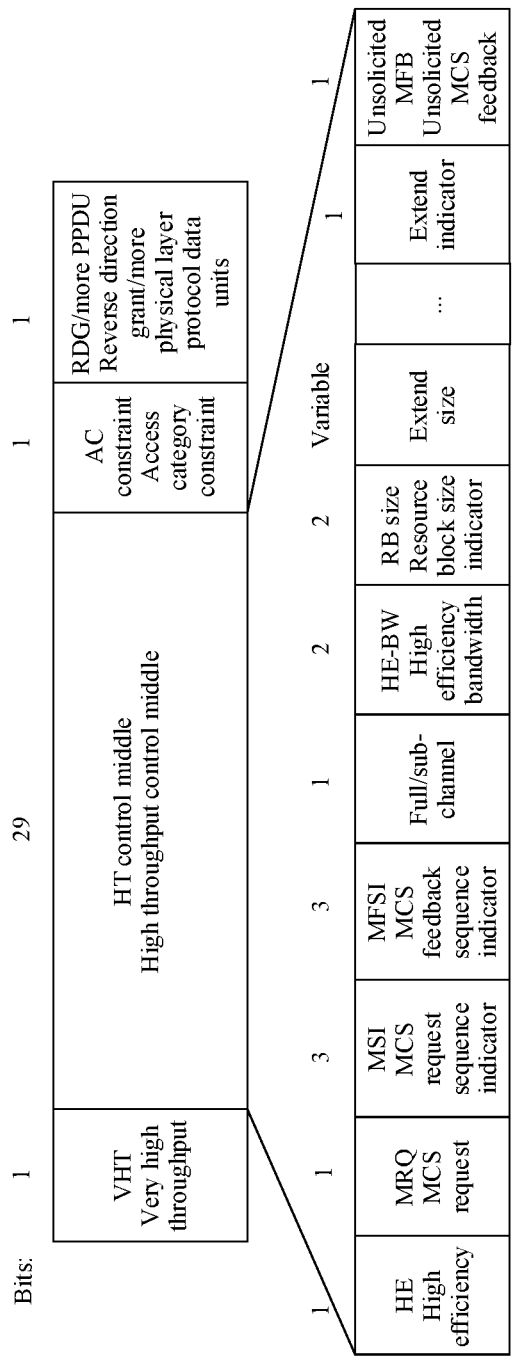
FIG. 10a is a schematic diagram of another format of an HT control field according to an embodiment of the present application.

In this embodiment, no limitation is set on a specific location and a bit quantity of the third sub-field. For example, in this embodiment, the third sub-field may be denoted as an extend size (Extend Region Size, extend region size) field. For details, reference may be made to FIG. 10a, which is a schematic diagram of another format of an HT control field according to an embodiment of the present application. In an actual application process, the extend size field may use a bitmap to specify multiple resource blocks, for example, to instruct the second network device to measure the channel information over the first, the third, and the fifth resource blocks.

Preferably, a type of the resource block may be further indicated herein, so as to determine whether the resource block is obtained by division based on entire transmission bandwidth or based on partial transmission bandwidth. Therefore, the second field may further include a fourth sub-field, and the fourth sub-field is used to indicate whether the resource block is a first resource block or a second resource block. The first resource block is a resource block obtained by resource division based on entire transmission bandwidth, and the second resource block is a resource block obtained by resource division based on partial transmission bandwidth. In this case, the second field may be used to indicate first resource blocks or second resource blocks over which the second network device is to measure the channel information. That is, the second field uses multiple particular first resource blocks or multiple particular second resource blocks as the target bandwidth, so as to instruct the second network device to measure the channel information over the corresponding multiple resource blocks.

In this embodiment, no limitation is set on a specific location and a bit quantity of the fourth sub-field. For example, in this embodiment, the fourth sub-field may include one bit, denoted as a full/sub-channel bit. When the full/sub-channel bit is set to 1, it indicates that the resource block is the first resource block. When the full/sub-channel bit is set to 0, it indicates that the resource block is the second resource block. Preferably, for a bit location of the fourth sub-field, reference may be made to the description of the first indication field, including reusing a reserved bit, reusing an HE bit, implication, or the like, and details are not described herein again. It may be understood that in an actual application process, the fourth sub-field may be used with the first indication field, and the first indication field may be reused as the fourth sub-field.

Optionally, the second field may further include an RB size field. Herein, for descriptions of the RB size field, reference may be made to the foregoing descriptions, and details are not described again herein.

It should be noted that in this embodiment, when the second network device receives the first PPDU including the second field, the second network device measures the channel information over multiple resource blocks by using the first PPDU, to obtain multiple corresponding channel information measurement results. Each channel information measurement result can reflect a channel status of a corresponding resource block. Therefore, a second MPDU carried in the second PPDU further includes a third indication field, and the third indication field is used to indicate the multiple corresponding channel information measurement results. For example, the third indication field may be denoted as an MFB per RB (MCS feedback per resource block, MCS feedback per resource block). In this embodiment, the extend size field indicates a quantity of resource blocks over which the channel information is to be measured, and the third indication field is used to indicate a channel information measurement result of each resource block. Therefore, a bit quantity of the third indication field may be determined according to the extend size field.

Figure 10B:
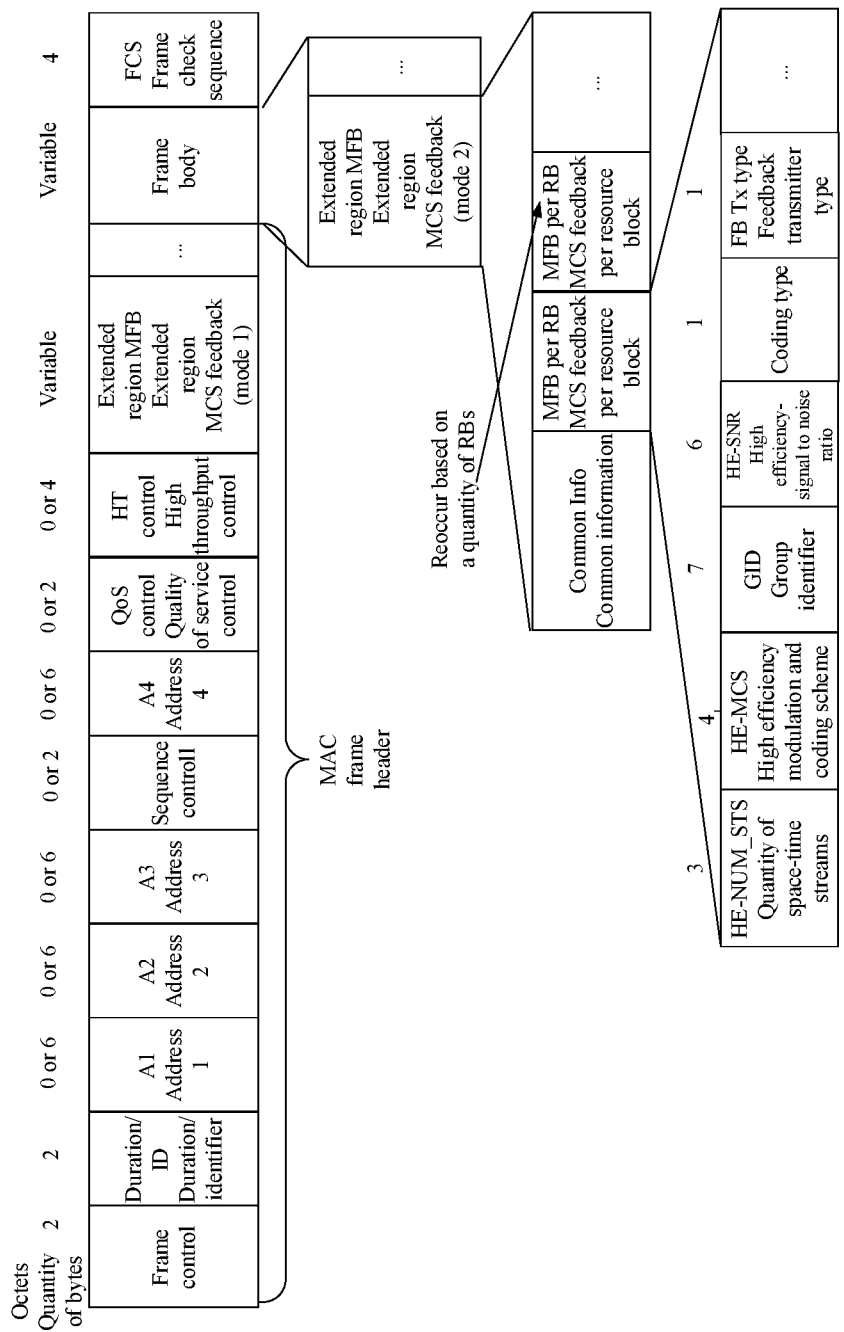
FIG. 10b is a schematic diagram of a format of a second MPDU according to an embodiment of the present application.

In this embodiment, no limitation is set on a specific location of the third indication field. Optionally, in this embodiment, the third indication field may be included in an extend region of the second MPDU. The extend region means a reserved bit not in an HT control field. For details, refer to FIG. 10b, which is a schematic diagram of a format of a second MPDU according to an embodiment of the present application. The extend region may be included in a frame header of the second MPDU (as shown in mode 1 in FIG. 10b), or may be included in a frame body of the second MPDU (as shown in mode 2 in FIG. 10b). It may be understood that in an actual application process, the third indication field may further include some common information.

In this embodiment, when the third indication field is included in the extend region of the second MPDU, an extend indication field, such as an extend indicator (extend indication) field in FIG. 8a, may generally be introduced in the HT control field, to indicate whether the first network device performs link adaptation based on the third indication field in the extend region of the second MPDU. For example, when the extend indication field is set to 1, it indicates that the first network device performs link adaptation based on the third indication field in the extend region of the second MPDU; when the extend indication field is set to 0, it indicates that the first network device does not need to perform link adaptation based on the third indication field in the extend region of the second MPDU. It may be understood that in some particular application scenarios, the extend indication field may not be included. For example, the first network device may perform, by default, link adaptation based on the third indication field in the extend region of the second MPDU.

Therefore, in this embodiment, a second field of an HT control field may be used to flexibly instruct a second network device to measure channel information over any multiple resource blocks, so as to obtain multiple channel information measurement results that can reflect channel statuses of corresponding resource blocks. The multiple channel information measurement results are sent to a first network device by using a third indication field of a second PPDU, so that the first network device performs link adaptation adjustment according to the channel information measurement results, to provide accurate link adaptation for each user in an OFDMA communications system.

It should be noted that only several examples are used in this embodiment to describe specific manners in which the measurement bandwidth indication field indicates bandwidth over which the channel information is to be measured. In some other embodiments, the foregoing indication manners may be used jointly, or another indication manner may be used, and no specific limitation is set herein.

In this embodiment, the partial transmission bandwidth refers to several specified sub-channels. For example, the partial transmission bandwidth may refer to a sub-channel that the first network device currently allocates to the second network device.

It should be noted that in this embodiment, descriptions are provided mainly by using an example in which the measurement bandwidth indication field is included in an HT control field of a PPDU. It may be understood that in some other embodiments, the measurement bandwidth indication field may be included in a signaling field of the first PPDU. For example, resource indication information in the signaling field of the first PPDU may be used to implicitly indicate whether the second network device measures the channel information over the entire transmission bandwidth or the partial transmission bandwidth. If the resource indication information indicates that the second network device occupies partial transmission bandwidth, it implicitly indicates that the second network device measures the channel information over the partial transmission bandwidth. If the resource indication information indicates that the second network device occupies entire transmission bandwidth, it implicitly indicates that the second network device measures the channel information over the entire transmission bandwidth. It may be understood that no limitation is set on a specific location and a bit quantity of the measurement bandwidth indication field in this embodiment of the present application.

It may be understood that in some other embodiments, all link adaptation-related fields in the first MPDU may be further set in the extend region, so as to implement link adaptation completely based on the extend region. Generally, an extend region indicator field may be further introduced. The extend region indicator field may be included in the signaling field (such as HE-SIG-A and HE-SIGB fields) of the first PPDU or the frame header of the first MPDU, to instruct the first network device to perform link adaptation based on the field in the extend region. The link adaptation-related field may include all fields that indicate various information in a link adaptation process, for example, information such as an MCS request, an MCS request sequence indicator, and a measurement bandwidth indication field.

Figure 8:
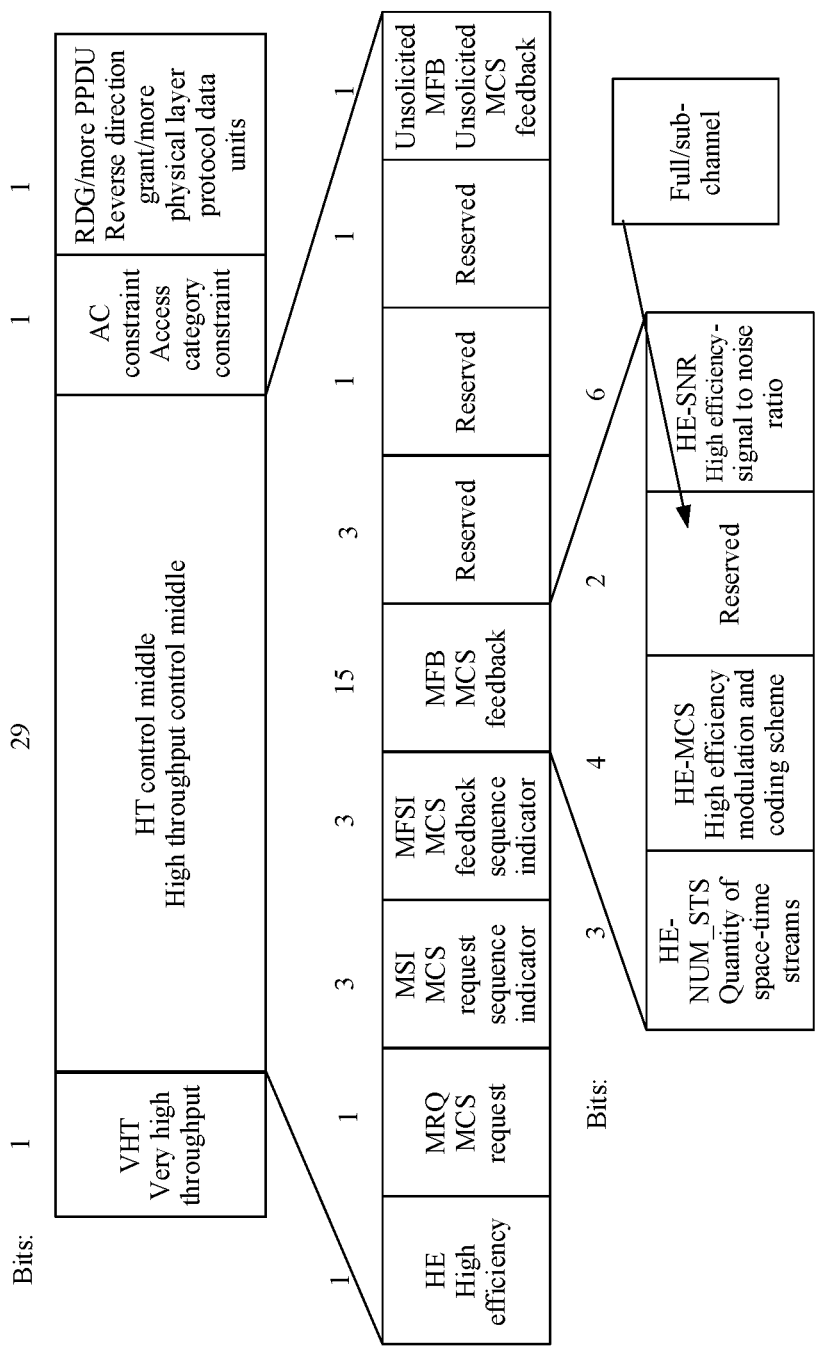
FIG. 8 is a schematic diagram of another format of an HT control field according to an embodiment of the present application.
Figure 11:
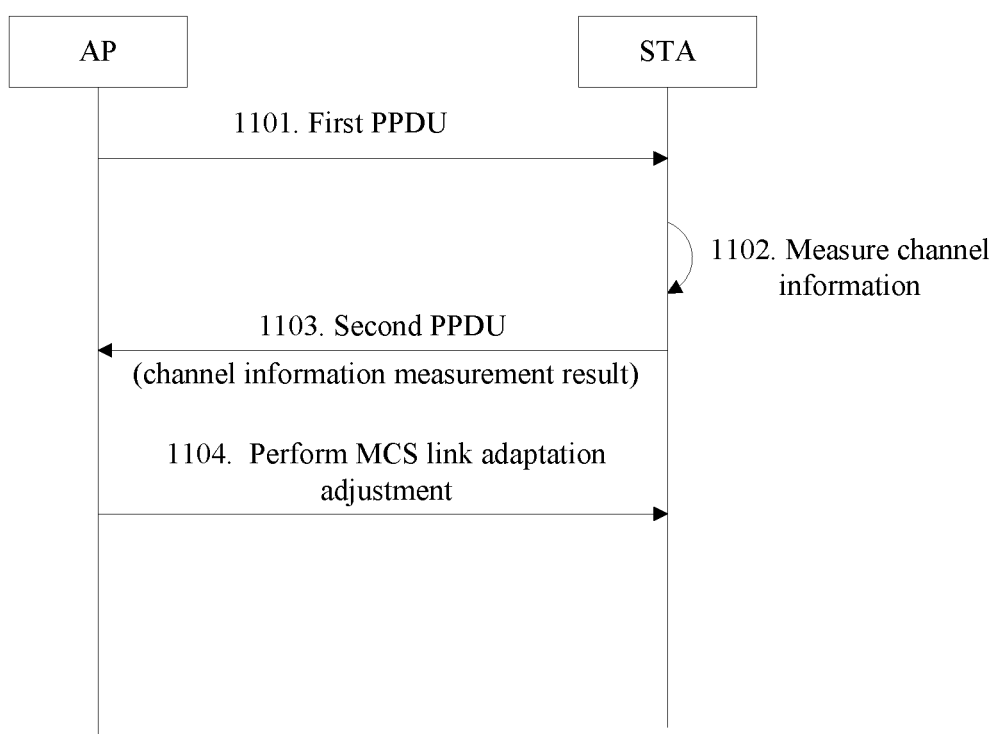
FIG. 11 is a schematic diagram of another embodiment of a WLAN link adaptation method according to the embodiments of the present application.

For ease of understanding, with reference to an HT control field shown in FIG. 8, a specific application scenario is used to describe an MCS link adaptation procedure in a solicited feedback mechanism. Referring to FIG. 11, an embodiment of a WLAN link adaptation method in the embodiments of the present application includes the following steps.

1101. An AP sends, to a STA, a first PPDU carrying an HE-variant HT control field.

Figure 12:
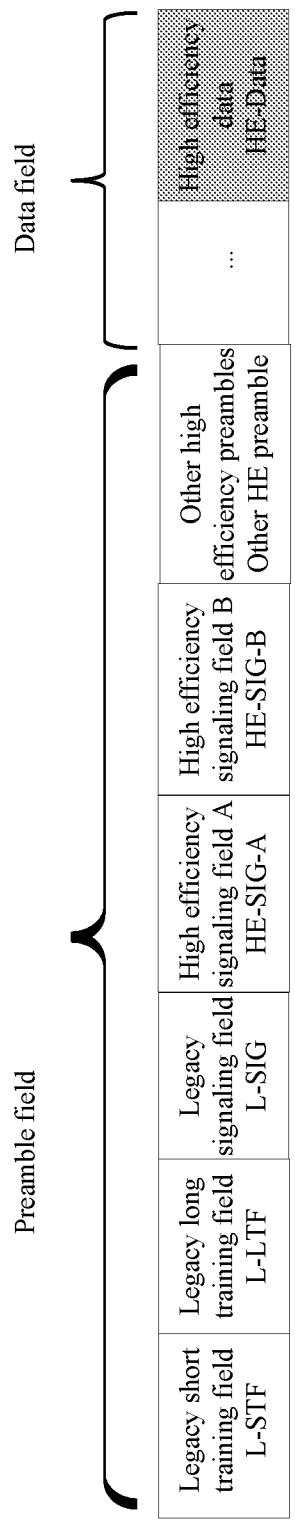
FIG. 12 is a schematic diagram of a format of a first PPDU according to an embodiment of the present application.

Referring to FIG. 12, FIG. 12 is a schematic diagram of a format of a first PPDU according to an embodiment of the present application, including a preamble field and a data field. A first MPDU is carried in the data field, and the first MPDU includes the HE-variant HT control field. An HE-SIG-B (High Efficiency Signal Field-B, high efficiency signal field-B) field of the first PPDU carries resource indication information, to indicate data of multiple users of high efficiency data.

In this embodiment, the HE-SIG-B is used to indicate the resource indication information. Both a VHT bit and an HE bit of an HT control field are set to 1, to indicate that the current HT control field is an HE-variant HT control field. An MRQ is set to 1 and an unsolicited MFB is set to 0, to indicate that the MCS link adaptation procedure in the solicited feedback mechanism is to be performed. A full/sub-channel bit is set to 1, to instruct the STA to measure channel information over a sub-channel allocated to the STA.

1102. The STA receives the first PPDU sent by the AP, and measures channel information over target bandwidth by using the first PPDU, to obtain a channel information measurement result.

In this embodiment, the STA reads the resource indication information in the first PPDU, and retrieves, from a corresponding location according to the resource indication information, the first MPDU corresponding to the current STA. Herein, it may be understood that each STA may retrieve, from a corresponding location according to resource indication information, a first MPDU corresponding to the STA. The STA further reads the first MPDU, and measures, according to indication of the HT control field of the first MPDU, the channel information over the sub-channel allocated to the STA.

In this embodiment, the channel information measurement result may include a recommended space-time stream quantity, a recommended MCS, bandwidth used for the recommended MCS, an average efficient SNR, and the like, and no specific limitation is set herein.

1103. The STA sends a second PPDU including the channel information measurement result to the AP.

In this embodiment, the second PPDU carries an HT control field, and the HT control field carries the channel information measurement result.

1104. The AP receives the second PPDU sent by the STA, and performs MCS link adaptation adjustment according to the channel information measurement result indicated in the second PPDU.

In this embodiment, after receiving the second PPDU, the AP reads the channel information measurement result, and performs MCS link adaptation adjustment according to the channel information measurement result.

Figure 13:
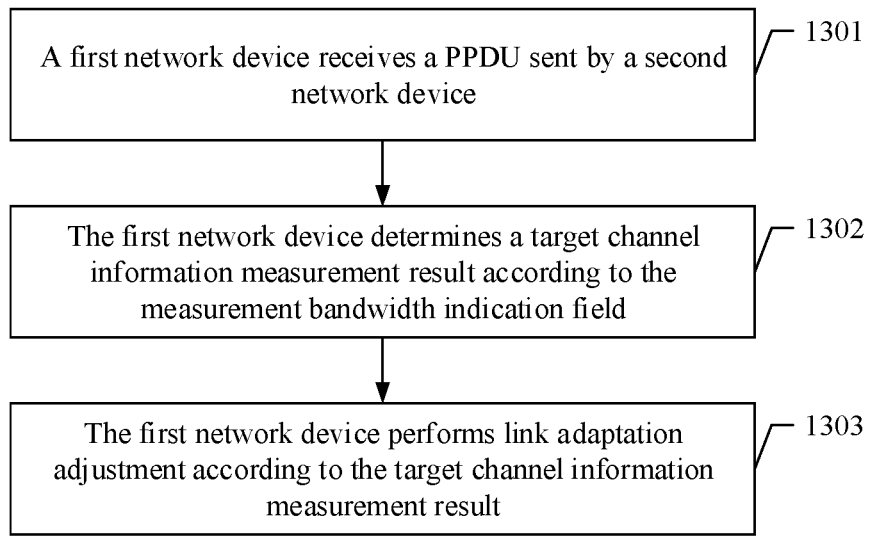
FIG. 13 is a schematic diagram of another embodiment of a WLAN link adaptation method according to the embodiments of the present application.

The following describes a link adaptation procedure in an unsolicited feedback mechanism from the perspective of a first network device. Referring to FIG. 13, another embodiment of a WLAN link adaptation method in the embodiments of the present application includes the following steps.

1301. The first network device receives a PPDU sent by a second network device.

In this embodiment, the PPDU indicates that the second network device unsolicitedly sends a channel information measurement result, to indicate that link adaptation in the unsolicited feedback mechanism is to be performed. It may be understood that in an actual application process, the PPDU may indicate, by using its preamble field or its carried MPDU, that the second network device unsolicitedly sends the channel information measurement result, and no specific limitation is set herein.

In this embodiment, the PPDU further includes a measurement bandwidth indication field, and the measurement bandwidth indication field is used to indicate bandwidth over which the second network device measures channel information. It may be understood that in an actual application process, the measurement bandwidth indication field may be included in the preamble field (for example, a SIG-B field) of the PPDU, or may be included in the MPDU of the PPDU, and no specific limitation is set herein.

The following describes in detail how the measurement bandwidth indication field indicates bandwidth over which the channel information is measured by using different examples.

Optionally, in this embodiment, the measurement bandwidth indication field may include a first indication field. The first indication field is used to indicate whether the second network device measures the channel information over entire transmission bandwidth or partial transmission bandwidth.

Optionally, in this embodiment, the measurement bandwidth indication field may include a second indication field. The second indication field is used to indicate a resource block or resource blocks over which the second network device measures the channel information. In this embodiment, there may be one or more resource blocks. Therefore, optionally, the second indication field may include a first field, and the first field includes a first sub-field. The first sub-field is used to indicate a resource block over which the second network device measures the channel information. Preferably, a type of the resource block may be further indicated herein, so as to determine whether the resource block is obtained by division based on entire transmission bandwidth or based on partial transmission bandwidth. Therefore, the first field may further include a second sub-field, and the second sub-field is used to indicate whether the resource block is a first resource block or a second resource block. The first resource block is a resource block obtained by resource division based on entire transmission bandwidth, and the second resource block is a resource block obtained by resource division based on partial transmission bandwidth. Alternatively, optionally, in this embodiment, the measurement bandwidth indication field may include a second field, and the second field includes a third sub-field. The third sub-field is used to indicate resource blocks over which the second network device measures the channel information. It should be noted that in this case, the PPDU further includes a third indication field, and the third indication field is used to indicate multiple corresponding channel information measurement results. Likewise, preferably, a type of the resource block may be further indicated herein, so as to determine whether the resource block is obtained by division based on entire transmission bandwidth or based on partial transmission bandwidth. Therefore, the second field may further include a fourth sub-field, and the fourth sub-field is used to indicate whether the resource block is a first resource block or a second resource block. The first resource block is a resource block obtained by resource division based on entire transmission bandwidth, and the second resource block is a resource block obtained by resource division based on partial transmission bandwidth.

It may be understood that in an actual application process, the foregoing indication manners may be used jointly, or another indication manner may be used, and no specific limitation is set herein.

In this embodiment, the partial transmission bandwidth refers to several specified sub-channels. For example, the partial transmission bandwidth may refer to a sub-channel that the first network device currently allocates to the second network device.

It should be noted that in the link adaptation procedure in the unsolicited feedback mechanism, the second network device may unsolicitedly send multiple PPDUs to the first network device, so as to unsolicitedly and uninterruptedly feed back multiple channel information measurement results to the first network device. It may be understood that in an actual application process, the second network device may measure the channel information over any bandwidth. For example, the second network device measures the channel information over a sub-channel allocated to the second network device, or the second network device measures the channel information over entire transmission bandwidth, and no specific limitation is set herein.

1302. The first network device determines a target channel information measurement result according to the measurement bandwidth indication field.

In this embodiment, after receiving the PPDU, the first network device may learn, according to the measurement bandwidth indication field, bandwidth over which the channel information measurement result indicated by the PPDU is obtained through measurement, and determines whether to use a channel information measurement result measured over the bandwidth as a reference channel information measurement result for subsequent link adaptation adjustment. If the channel information measurement result measured over the bandwidth is used as the reference channel information measurement result for subsequent link adaptation adjustment, the first network device determines the channel information measurement result as the target channel information measurement result.

It may be understood that in the link adaptation procedure in the unsolicited feedback mechanism, the first network device may receive the multiple PPDUs sent by the second network device, and learn, according to indication of the measurement bandwidth indication field, bandwidth over which the channel information measurement result in each PPDU is obtained through measurement. Therefore, when the first network device needs to obtain a channel information measurement result measured over specific bandwidth, the first network device needs only to perform selection according to indication of the measurement bandwidth indication field, and it can then obtain a channel information measurement result that can reflect a channel status of the bandwidth. As a result, bandwidth over which the target channel information measurement result is obtained is specified.

1303. The first network device performs link adaptation adjustment according to the target channel information measurement result.

In this embodiment, the target channel information measurement result is a channel information measurement result measured over bandwidth specified by the first network device. In this way, the first network device can choose a channel information result measured over specified bandwidth, to perform link adaptation adjustment.

In the technical solution provided in this embodiment of the present application, a first network device receives a PPDU sent by a second network device, the PPDU indicates that the second network device unsolicitedly sends a channel information measurement result, the PPDU further includes a measurement bandwidth indication field, and the measurement bandwidth indication field is used to indicate bandwidth over which the second network device measures channel information. The first network device determines a target channel information measurement result according to the measurement bandwidth indication field, and performs link adaptation adjustment according to the target channel information measurement result. In this way, the first network device can choose a channel information result measured over specified bandwidth, to perform link adaptation adjustment. Therefore, in comparison with the prior art, in this embodiment of the present application, a measurement bandwidth indication field is further carried in a PPDU to specify bandwidth over which channel information is measured, so that the first network device learns bandwidth over which a channel information measurement result is obtained through measurement. Therefore, in comparison with the prior art in which link adaptation adjustment is performed by default according to a channel information result measured over entire transmission bandwidth, in this embodiment of the present application, bandwidth can be flexibly chosen and link adaptation adjustment is performed according to a channel information result measured over the bandwidth, so as to provide accurate link adaptation for each user in an OFDMA communications system.

Figure 14:
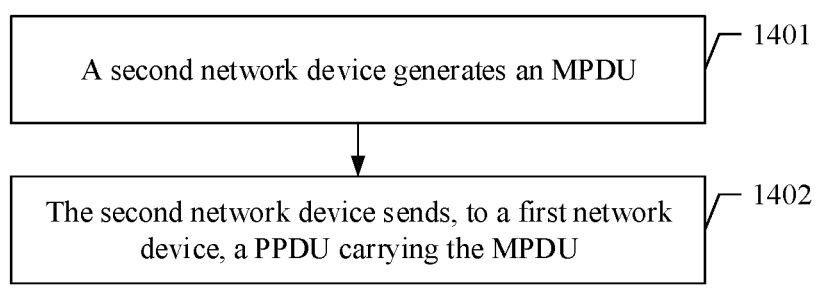
FIG. 14 is a schematic diagram of another embodiment of a WLAN link adaptation method according to the embodiments of the present application.

The following describes a link adaptation procedure of an unsolicited feedback mechanism from the perspective of a second network device. Referring to FIG. 14, another embodiment of a WLAN link adaptation method in the embodiments of the present application includes the following steps.

1401. A second network device generates a PPDU.

In this embodiment, the PPDU indicates that the second network device unsolicitedly sends a channel information measurement result, to indicate that link adaptation in the unsolicited feedback mechanism is to be performed. It may be understood that in an actual application process, the PPDU may indicate, by using its preamble field or its carried MPDU, that the second network device unsolicitedly sends the channel information measurement result, and no specific limitation is set herein.

In this embodiment, the PPDU further includes a measurement bandwidth indication field. The measurement bandwidth indication field is used to indicate bandwidth over which the second network device measures channel information, that is, may indicate bandwidth based on which the channel information measurement result is obtained through measurement.

Herein, for descriptions of the measurement bandwidth indication field, reference may be made to step 501 in the embodiment shown in FIG. 5, and details are not described herein again.

It should be noted that in the link adaptation procedure in the unsolicited feedback mechanism, the second network device may unsolicitedly send multiple PPDUs to a first network device, so as to unsolicitedly and uninterruptedly feed back multiple channel information measurement results to the first network device. It may be understood that in an actual application process, the second network device may measure the channel information over any bandwidth. For example, the second network device measures the channel information over a sub-channel allocated to the second network device, or the second network device measures the channel information over entire transmission bandwidth, and no specific limitation is set herein.

1402. The second network device sends the PPDU to a first network device.

In this embodiment, the PPDU is used by the first network device to determine a target channel information measurement result according to the measurement bandwidth indication field, and link adaptation adjustment is performed according to the target channel information measurement result. Specifically, for a process in which the first network device determines the target channel information measurement result according to the measurement bandwidth indication field, and performs link adaptation adjustment according to the target channel information measurement result, reference may be made to step 1302 and step 1303 in the embodiment shown in FIG. 13.

In the technical solution provided in this embodiment of the present application, a second network device generates a PPDU, the PPDU indicates that the second network device unsolicitedly sends a channel information measurement result, the PPDU further includes a measurement bandwidth indication field, and the measurement bandwidth indication field is used to indicate bandwidth over which the second network device measures channel information. The second network device sends the PPDU to a first network device, and the PPDU is used by the first network device to determine a target channel information measurement result according to the measurement bandwidth indication field, and link adaptation adjustment is performed according to the target channel information measurement result. In this way, the first network device chooses a channel information result measured over specified bandwidth, to perform link adaptation adjustment. Therefore, in comparison with the prior art, in this embodiment of the present application, a measurement bandwidth indication field is carried in a PPDU to specify bandwidth over which channel information is measured, so that a first network device learns bandwidth over which a channel information measurement result is obtained through measurement. Therefore, in comparison with the prior art in which link adaptation adjustment is performed by default according to a channel information result measured over entire transmission bandwidth, in this embodiment of the present application, bandwidth can be flexibly chosen and link adaptation adjustment is performed according to a channel information result measured over the bandwidth, so as to provide accurate link adaptation for each user in an OFDMA communications system.

Figure 15:
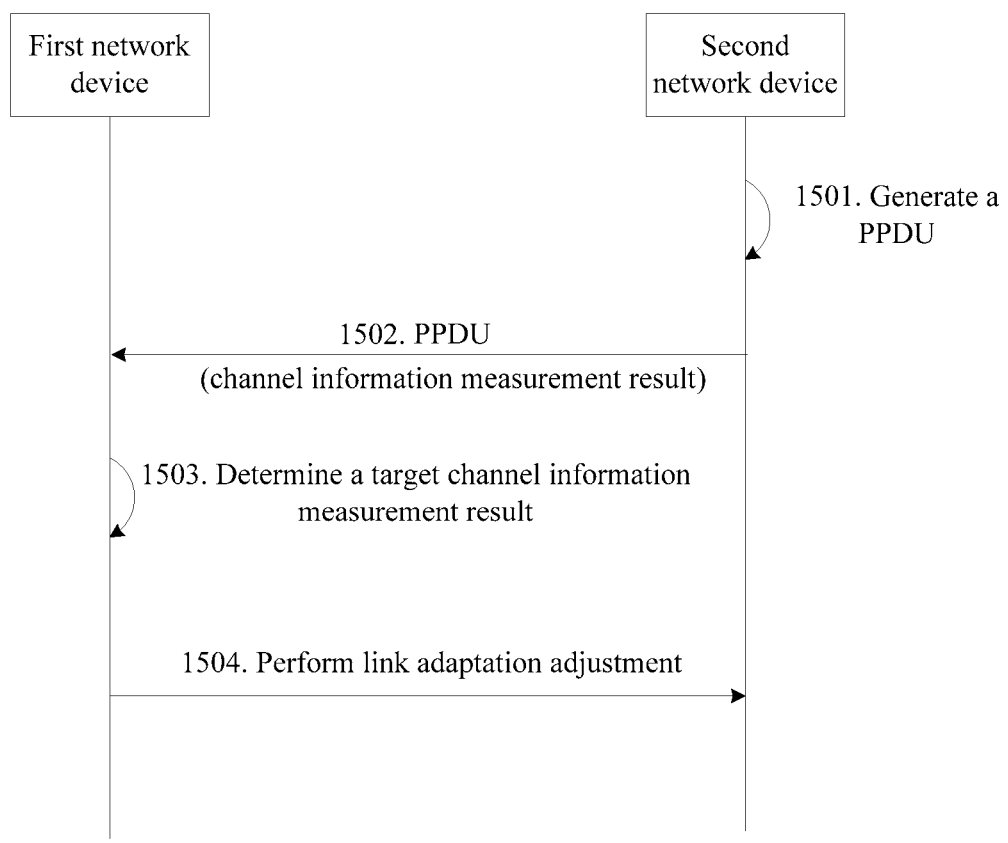
FIG. 15 is a schematic diagram of another embodiment of a WLAN link adaptation method according to the embodiments of the present application.

Based on the embodiments shown in FIG. 13 and FIG. 14, the following describes in detail a WLAN link adaptation method in the unsolicited feedback mechanism by using an example in which the measurement bandwidth indication field is included in an HT control field of the PPDU. Referring to FIG. 15, another embodiment of a WLAN link adaptation method in the embodiments of the present application includes the following steps.

1501. A second network device generates a PPDU.

In this embodiment, the PPDU carries at least one MPDU, and the MPDU indicates that the second network device unsolicitedly sends a channel information measurement result, to indicate that link adaptation in the unsolicited feedback mechanism is to be performed. It may be understood that the MPDU further carries a channel information measurement result.

In this embodiment, the MPDU includes an HT control field, and the HT control field further includes a measurement bandwidth indication field. The measurement bandwidth indication field is used to indicate bandwidth over which the second network device measures channel information, that is, may indicate bandwidth based on which the channel information measurement result is obtained through measurement.

The following describes in detail how the measurement bandwidth indication field indicates bandwidth over which the channel information is measured by using different examples.

Optionally, in this embodiment, the measurement bandwidth indication field may include a first indication field. The first indication field is used to indicate whether the second network device measures the channel information over entire transmission bandwidth or partial transmission bandwidth.

Optionally, in this embodiment, the measurement bandwidth indication field may include a second field. The second indication field is used to indicate a resource block or resource blocks over which the second network device measures the channel information. In this embodiment, there may be one or more resource blocks. Therefore, optionally, the second indication field may include a first field, and the first field includes a first sub-field. The first sub-field is used to indicate a resource block over which the second network device measures the channel information. Preferably, a type of the resource block may be further indicated herein, so as to determine whether the resource block is obtained by division based on entire transmission bandwidth or based on partial transmission bandwidth. Therefore, the first field may further include a second sub-field, and the second sub-field is used to indicate whether the resource block is a first resource block or a second resource block. The first resource block is a resource block obtained by resource division based on entire transmission bandwidth, and the second resource block is a resource block obtained by resource division based on partial transmission bandwidth. Alternatively, optionally, in this embodiment, the measurement bandwidth indication field may include a second field, and the second field includes a third sub-field. The third sub-field is used to indicate resource blocks over which the second network device measures the channel information. It should be noted that in this case, the PPDU further includes a third indication field, and the third indication field is used to indicate multiple corresponding channel information measurement results. Likewise, preferably, a type of the resource block may be further indicated herein, so as to determine whether the resource block is obtained by division based on entire transmission bandwidth or based on partial transmission bandwidth. Therefore, the second field may further include a fourth sub-field, and the fourth sub-field is used to indicate whether the resource block is a first resource block or a second resource block. The first resource block is a resource block obtained by resource division based on entire transmission bandwidth, and the second resource block is a resource block obtained by resource division based on partial transmission bandwidth.

It may be understood that in an actual application process, the foregoing indication manners may be used jointly, or another indication manner may be used, and no specific limitation is set herein. It may be understood that in an actual application process, for a specific format of the measurement bandwidth indication field, reference may be further made to the descriptions in the embodiment shown in FIG. 6, and details are not described herein again.

Optionally, in this embodiment, the MPDU may include a control wrapper (Control Wrapper) frame, a QoS data frame available when a sequence bit of a frame control field is set to 1, a probe request frame, an association request frame, or the like. In an actual application process, the MPDU may further include some frames of other types, and no specific limitation is set herein on a frame type of the MPDU.

Optionally, in this embodiment, all link adaptation-related fields in the MPDU may be further set in an extend region, so as to implement link adaptation completely based on the extend region. Generally, an extend region indicator field may be further introduced. The extend region indicator field may be included in a signaling field (such as HE-SIG-A and HE-SIGB fields) of the first PPDU or a frame header of the MPDU, to instruct the first network device to perform link adaptation based on the field in the extend region. The link adaptation-related field may include all fields that indicate various information in a link adaptation process, for example, information such as an MCS request, an MCS request sequence indicator, and a measurement bandwidth indication field.

1502. The second network device sends the PPDU to a first network device.

Step 1502 in this embodiment is the same as step 1402 in the embodiment shown in FIG. 14, and details are not described herein again.

1503. The first network device determines a target channel information measurement result according to the measurement bandwidth indication field.

1504. The first network device performs link adaptation adjustment according to the target channel information measurement result.

Step 1503 and step 1504 in this embodiment are the same as step 1302 and step 1303 in the embodiment shown in FIG. 13, and details are not described herein again.

In the technical solution provided in this embodiment of the present application, a first network device receives a PPDU carrying at least one MPDU and sent by a second network device, the MPDU indicates that the second network device unsolicitedly sends a channel information measurement result, an HT control field of the MPDU further includes a measurement bandwidth indication field, and the measurement bandwidth indication field is used to indicate bandwidth over which the second network device measures channel information. The first network device determines a target channel information measurement result according to the measurement bandwidth indication field, and performs link adaptation adjustment according to the target channel information measurement result. In this way, the first network device can choose a channel information result measured over specified bandwidth, to perform link adaptation adjustment. Therefore, in comparison with the prior art, in this embodiment of the present application, a measurement bandwidth indication field is further carried in the HT control field to specify bandwidth over which channel information is measured, so that the first network device learns bandwidth over which a channel information measurement result is obtained through measurement. Therefore, in comparison with the prior art in which link adaptation adjustment is performed by default according to a channel information result measured over entire transmission bandwidth, in this embodiment of the present application, bandwidth can be flexibly chosen and link adaptation adjustment is performed according to a channel information result measured over the bandwidth, so as to provide accurate link adaptation for each user in an OFDMA communications system.

Figure 16:
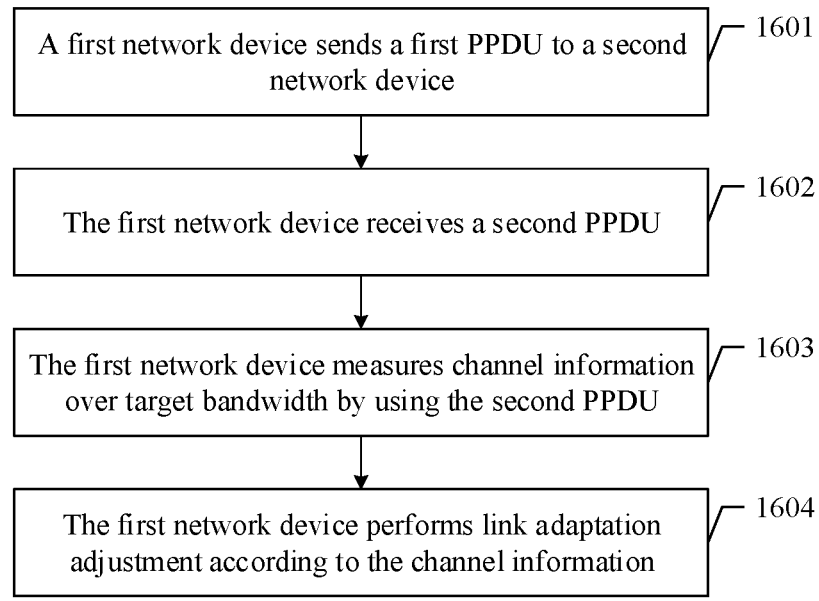
FIG. 16 is a schematic diagram of another embodiment of a WLAN link adaptation method according to the embodiments of the present application.

The following describes a link adaptation procedure of a TRQ mode from the perspective of a first network device. Referring to FIG. 16, another embodiment of a WLAN link adaptation method in the embodiments of the present application includes the following steps.

1601. A first network device sends a first PPDU to a second network device.

In this embodiment, the first PPDU indicates that the second network device needs to send a probe PPDU. It may be understood that in an actual application process, the first PPDU may indicate, by using its preamble field or its carried MPDU, that the second network device needs to send a probe PPDU, and no specific limitation is set herein.

In this embodiment, the first PPDU further includes a measurement bandwidth indication field, and the measurement bandwidth indication field is used to indicate that the first network device needs to measure channel information over target bandwidth. It may be understood that in an actual application process, the measurement bandwidth indication field may be included in the preamble field (for example, a SIG-B field) of the first PPDU, or may be included in the MPDU of the first PPDU, and no specific limitation is set herein.

The following describes in detail how the measurement bandwidth indication field indicates bandwidth over which the channel information is measured by using different examples.

Optionally, in this embodiment, the measurement bandwidth indication field may include a first indication field. The first indication field is used to indicate that the first network device needs to measure the channel information over entire transmission bandwidth or partial transmission bandwidth.

Optionally, in this embodiment, the measurement bandwidth indication field may include a second indication field. The second indication field is used to indicate that the first network device needs to measure the channel information over a specified resource block. In this embodiment, there may be one or more resource blocks. Therefore, optionally, the second indication field may include a first field. The first field includes a first sub-field, and the first sub-field is used to indicate a resource block over which the first network device needs to measure the channel information. Preferably, a type of the resource block may be further indicated herein, so as to determine whether the resource block is obtained by division based on entire transmission bandwidth or based on partial transmission bandwidth. Therefore, the first field may further include a second sub-field, and the second sub-field is used to indicate whether the resource block is a first resource block or a second resource block. The first resource block is a resource block obtained by resource division based on entire transmission bandwidth, and the second resource block is a resource block obtained by resource division based on partial transmission bandwidth. Alternatively, optionally, in this embodiment, the second indication field may include a second field, and the second field includes a third sub-field. The third sub-field is used to indicate resource blocks over which the first network device needs to measure the channel information. Likewise, preferably, a type of the resource block may be further indicated herein, so as to determine whether the resource block is obtained by division based on entire transmission bandwidth or based on partial transmission bandwidth. Therefore, the second field may further include a fourth sub-field, and the fourth sub-field is used to indicate whether the resource block is a first resource block or a second resource block. The first resource block is a resource block obtained by resource division based on entire transmission bandwidth, and the second resource block is a resource block obtained by resource division based on partial transmission bandwidth.

It may be understood that in an actual application process, the foregoing indication manners may be used jointly, or another indication manner may be used, and no specific limitation is set herein.

In this embodiment, the partial transmission bandwidth refers to several specified sub-channels. For example, the partial transmission bandwidth may refer to a sub-channel that the first network device currently allocates to the second network device.

1602. The first network device receives a second PPDU.

In this embodiment, the second PPDU is the probe PPDU generated by the second network device according to the measurement bandwidth indication field, so as to obtain a probe PPDU of corresponding target bandwidth.

1603. The first network device measures channel information over target bandwidth by using the second PPDU.

In this embodiment, after receiving the second PPDU, the first network device measures the channel information over the target bandwidth by using the second PPDU. For example, in an MCS link adaptation process, the channel information may include a channel SNR and the like, and no limitation is set on specific content of the channel information.

1604. The first network device performs link adaptation adjustment according to the channel information.

In this embodiment, the channel information can reflect a channel status of the target bandwidth.

In the technical solution provided in this embodiment of the present application, a first network device sends a first PPDU to a second network device, the first PPDU indicates that the second network device needs to send a probe PPDU, the first PPDU further includes a measurement bandwidth indication field, and the measurement bandwidth indication field is used to indicate that the first network device needs to measure channel information over target bandwidth. The first network device receives a second PPDU, and the second PPDU is the probe PPDU generated by the second network device according to the measurement bandwidth indication field. Then, the first network device measures the channel information over the target bandwidth by using the second PPDU, and performs link adaptation adjustment according to the channel information. Therefore, in comparison with the prior art, in this embodiment of the present application, a measurement bandwidth indication field is further carried in a first PPDU to specify bandwidth over which channel information is to be measured, so as to obtain a channel information measurement result that can reflect a channel status of the specified bandwidth. Therefore, in comparison with the prior art in which link adaptation adjustment is performed by default according to a channel information result measured over entire transmission bandwidth, in this embodiment of the present application, bandwidth over which channel information is to be measured can be flexibly specified, and link adaptation adjustment is performed according to a corresponding channel information result, so as to provide accurate link adaptation for each user in an OFDMA communications system.

Figure 17:
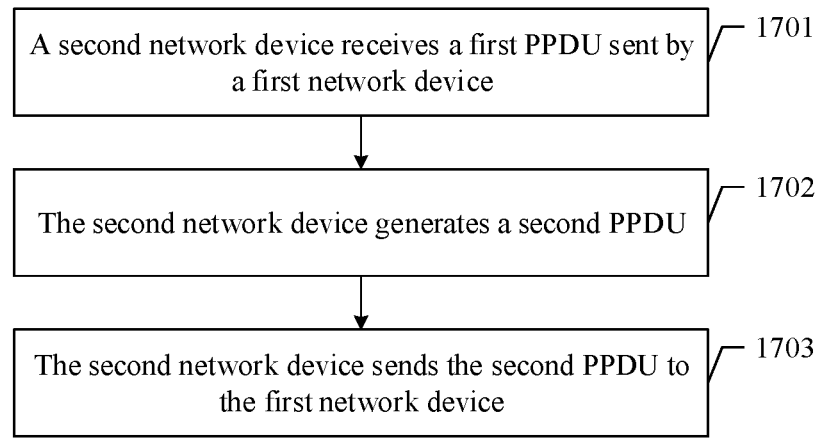
FIG. 17 is a schematic diagram of another embodiment of a WLAN link adaptation method according to the embodiments of the present application.

The following describes a link adaptation procedure of a TRQ mode from the perspective of a second network device. Referring to FIG. 17, another embodiment of a WLAN link adaptation method in the embodiments of the present application includes the following steps.

1701. A second network device receives a first PPDU sent by a first network device.

In this embodiment, the first PPDU indicates that the second network device needs to send a probe PPDU. It may be understood that in an actual application process, the first PPDU may indicate, by using its preamble field or its carried MPDU, that the second network device needs to send a probe PPDU, and no specific limitation is set herein.

In this embodiment, the first PPDU further includes a measurement bandwidth indication field, and the measurement bandwidth indication field is used to indicate that the first network device needs to measure channel information over target bandwidth. It may be understood that in an actual application process, the measurement bandwidth indication field may be included in the preamble field (for example, a SIG-B field) of the first PPDU, or may be included in the MPDU of the first PPDU, and no specific limitation is set herein.

Herein, for descriptions of the measurement bandwidth indication field, reference may be made to step 1601 in the embodiment shown in FIG. 16, and details are not described herein again.

1702. The second network device generates a second PPDU.

In this embodiment, after receiving the first PPDU sent by the first network device, the second network device reads the measurement bandwidth indication field of the first PPDU, and generates a probe PPDU of the corresponding target bandwidth according to the measurement bandwidth indication field.

1703. The second network device sends the second PPDU to the first network device.

It should be noted that in this embodiment, the second PPDU is used by the first network device to measure the channel information over the target bandwidth, and link adaptation adjustment is performed according to the channel information. Specifically, herein, for a process in which the first network device measures the channel information over the target bandwidth by using the second PPDU, and performs link adaptation adjustment according to the channel information, reference may be made to step 1603 and step 1604 in the embodiment shown in FIG. 16.

In the technical solution provided in this embodiment of the present application, a second network device receives a first PPDU sent by a first network device, the first PPDU indicates that the second network device needs to send a probe PPDU, the first PPDU further includes a measurement bandwidth indication field, and the measurement bandwidth indication field is used to indicate that the first network device needs to measure channel information over target bandwidth. The second network device generates a second PPDU, and the second PPDU is the probe PPDU generated by the second network device according to the measurement bandwidth indication field. Then, the second network device sends the second PPDU to the first network device, where the second PPDU is used by the first network device to measure the channel information over the target bandwidth, and link adaptation adjustment is performed according to the channel information. Therefore, in comparison with the prior art, in this embodiment of the present application, a measurement bandwidth indication field is further carried in a PPDU to specify bandwidth over which channel information is to be measured, so as to obtain a channel information measurement result that can reflect a channel status of the specified bandwidth. Therefore, in comparison with the prior art in which link adaptation adjustment is performed by default according to a channel information result measured over entire transmission bandwidth, in this embodiment of the present application, bandwidth over which channel information is to be measured can be flexibly specified, and link adaptation adjustment is performed according to a corresponding channel information result, so as to provide accurate link adaptation for each user in an OFDMA communications system.

Figure 18:
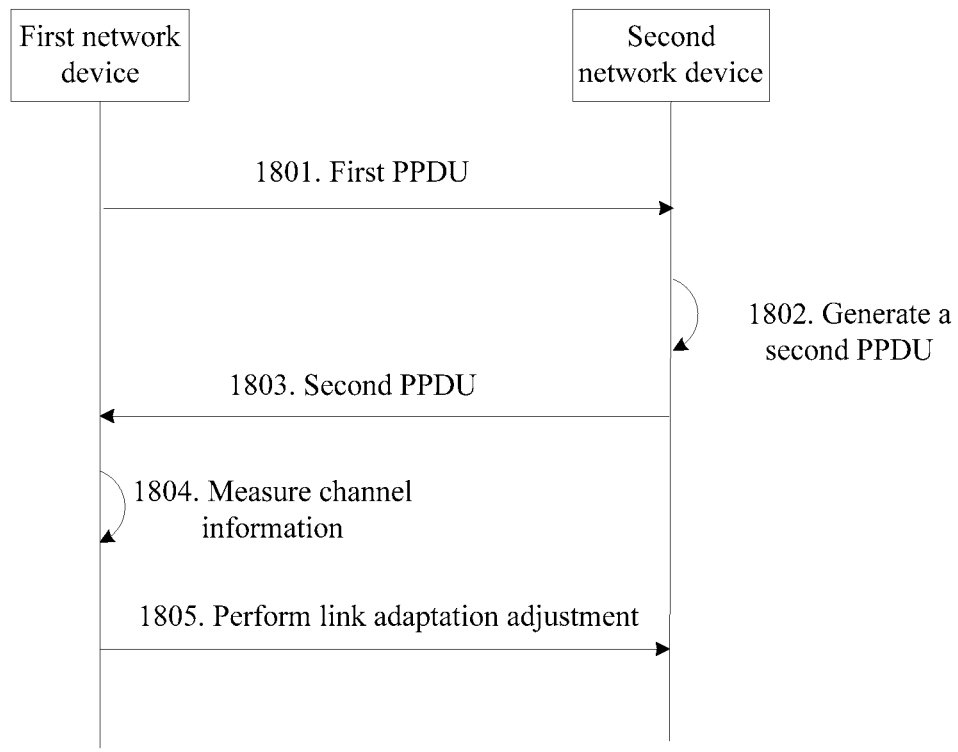
FIG. 18 is a schematic diagram of another embodiment of a WLAN link adaptation method according to the embodiments of the present application.

Based on the embodiments shown in FIG. 16 and FIG. 17, the following describes in detail a WLAN link adaptation method in a TRQ mode by using an example in which the measurement bandwidth indication field is included in an HT control field of the first PPDU. Referring to FIG. 18, another embodiment of a WLAN link adaptation method in the embodiments of the present application includes the following steps.

1801. A first network device sends a first PPDU to a second network device.

In this embodiment, the first PPDU carries at least one MPDU, and the MPDU indicates that the second network device needs to send a probe PPDU. For example, in an actual application process, a training request (TRQ) bit may be set to 1 to indicate that the second network device needs to send a probe PPDU.

In this embodiment, the MPDU includes an HT control field, and the HT control field further includes a measurement bandwidth indication field. The measurement bandwidth indication field is used to indicate that the first network device needs to measure channel information over target bandwidth.

The following describes in detail how the measurement bandwidth indication field indicates bandwidth over which the channel information is measured by using different examples.

Optionally, in this embodiment, the measurement bandwidth indication field may include a first indication field. The first indication field is used to indicate that the first network device needs to measure the channel information over entire transmission bandwidth or partial transmission bandwidth.

Optionally, in this embodiment, the measurement bandwidth indication field may include a second indication field. The second indication field is used to indicate that the first network device needs to measure the channel information over a specified resource block. In this embodiment, there may be one or more resource blocks. Therefore, optionally, the second indication field may include a first field. The first field includes a first sub-field, and the first sub-field is used to indicate a resource block over which the first network device needs to measure the channel information. Preferably, a type of the resource block may be further indicated herein, so as to determine whether the resource block is obtained by division based on entire transmission bandwidth or based on partial transmission bandwidth. Therefore, the first field may further include a second sub-field, and the second sub-field is used to indicate whether the resource block is a first resource block or a second resource block. The first resource block is a resource block obtained by resource division based on entire transmission bandwidth, and the second resource block is a resource block obtained by resource division based on partial transmission bandwidth. Alternatively, optionally, in this embodiment, the second indication field may include a second field, and the second field includes a third sub-field. The third sub-field is used to indicate resource blocks over which the first network device needs to measure the channel information. Likewise, preferably, a type of the resource block may be further indicated herein, so as to determine whether the resource block is obtained by division based on entire transmission bandwidth or based on partial transmission bandwidth. Therefore, the second field may further include a fourth sub-field, and the fourth sub-field is used to indicate whether the resource block is a first resource block or a second resource block. The first resource block is a resource block obtained by resource division based on entire transmission bandwidth, and the second resource block is a resource block obtained by resource division based on partial transmission bandwidth.

It may be understood that in an actual application process, the foregoing indication manners may be used jointly, or another indication manner may be used, and no specific limitation is set herein. It may be understood that in an actual application process, for a specific format of the measurement bandwidth indication field, reference may be further made to the descriptions in the embodiment shown in FIG. 6, and details are not described herein again.

Optionally, in this embodiment, the MPDU may include a control wrapper (Control Wrapper) frame, a QoS data frame available when a sequence bit of a frame control field is set to 1, a beacon frame, a probe response frame, an association response frame, or the like. In an actual application process, the MPDU may further include some frames of other types, and no specific limitation is set herein on a frame type of the MPDU.

1802. The second network device generates a second PPDU.

1803. The second network device sends the second PPDU to the first network device.

Step 1802 and step 1803 in this embodiment are the same as step 1702 and step 1703 in the embodiment shown in FIG. 17, and details are not described herein again.

1804. The first network device measures channel information over target bandwidth by using the second PPDU.

1805. The first network device performs link adaptation adjustment according to the channel information.

Step 1804 and step 1805 in this embodiment are the same as step 1603 and step 1604 in the embodiment shown in FIG. 16, and details are not described herein again.

Optionally, in this embodiment, all link adaptation-related fields in the MPDU may be further set in an extend region, so as to implement link adaptation completely based on the extend region. Generally, an extend region indicator field may be further introduced. The extend region indicator field may be included in a signaling field (such as HE-SIG-A and HE-SIGB fields) of the first PPDU or a frame header of the first MPDU, to instruct the first network device to perform link adaptation based on the field in the extend region. The link adaptation-related field may include all fields that indicate various information in a link adaptation process, for example, information such as an MCS request, an MCS request sequence indicator, and a measurement bandwidth indication field.

In the technical solution provided in this embodiment of the present application, a first network device sends, to a second network device, a first PPDU carrying an MPDU, the MPDU indicates that the second network device needs to send a probe PPDU, an HT control field of the MPDU further includes a measurement bandwidth indication field, and the measurement bandwidth indication field is used to indicate that the first network device needs to measure channel information over target bandwidth. The first network device receives a second PPDU, and the second PPDU is the probe PPDU generated by the second network device according to the measurement bandwidth indication field. Then, the second PPDU is used by the first network device to measure the channel information over the target bandwidth, and link adaptation adjustment is performed according to the channel information. Therefore, in comparison with the prior art, in this embodiment of the present application, a measurement bandwidth indication field is further carried in an HT control field to specify bandwidth over which channel information is to be measured, so as to obtain a channel information measurement result that can reflect a channel status of the specified bandwidth. Therefore, in comparison with the prior art in which link adaptation adjustment is performed by default according to a channel information result measured over entire transmission bandwidth, in this embodiment of the present application, bandwidth over which channel information is to be measured can be flexibly specified, and link adaptation adjustment is performed according to a corresponding channel information result, so as to provide accurate link adaptation for each user in an OFDMA communications system.

Figure 19:
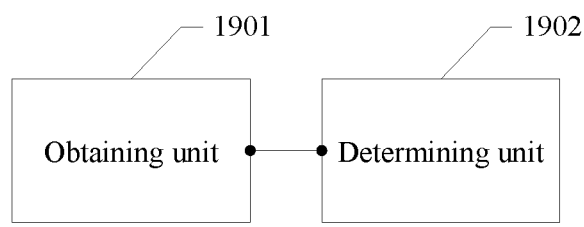
FIG. 19 is a schematic diagram of an embodiment of a network device according to the embodiments of the present application.

The WLAN link adaptation methods in the embodiments of the present application are described above, and the following describes network devices in the embodiments of the present application. Referring to FIG. 19, an embodiment of a network device in the embodiments of the present application includes:

an obtaining unit 1901, configured to obtain a target channel information measurement result, where the target channel information measurement result is a measurement result obtained by measuring channel information over target bandwidth; and a determining unit 1902, configured to determine a modulation and coding scheme MCS of a link according to the target channel information measurement result.

For ease of understanding, a specific application scenario is used as an example below to describe an internal operation procedure of the network device in this embodiment:

The obtaining unit 1901 obtains a target channel information measurement result, where the target channel information measurement result is a measurement result obtained by measuring channel information over target bandwidth. The determining unit 1902 determines a modulation and coding scheme MCS of a link according to the target channel information measurement result.

In the technical solution provided in this embodiment of the present application, an obtaining unit 1901 of the network device obtains a target channel information measurement result, where the target channel information measurement result is a measurement result obtained by measuring channel information over target bandwidth; and a determining unit 1902 determines a modulation and coding scheme MCS of a link according to the target channel information measurement result. Therefore, in comparison with the prior art in which link adaptation adjustment is performed by default according to a channel information result measured over entire transmission bandwidth, in this embodiment of the present application, a channel information measurement result of particular bandwidth can be flexibly obtained, and link adaptation adjustment is performed according to a corresponding channel information result, so as to provide accurate link adaptation for each user in an OFDMA communications system.

Figure 20:
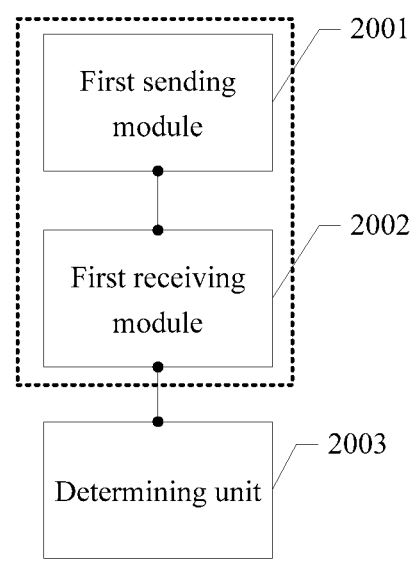
FIG. 20 is a schematic diagram of another embodiment of a network device according to the embodiments of the present application.

The following describes a network device in a solicited feedback mechanism. For details, refer to FIG. 20. Another embodiment of a network device in the embodiments of the present application includes:

The network device in this embodiment of the present application can implement the procedure in the embodiment shown in FIG. 5. The network device includes:

a first sending module 2001, configured to send a first physical layer protocol data unit PPDU to a target network device, where the first PPDU indicates that the target network device needs to send a channel information measurement result, and the first PPDU further includes a measurement bandwidth indication field, where the measurement bandwidth indication field is used to instruct the target network device to measure the channel information over the target bandwidth;

a first receiving module 2002, configured to receive a second PPDU including the target channel information measurement result and sent by the target network device, where the target channel information measurement result is obtained by the target network device by measuring the channel information over the target bandwidth by using the first PPDU; and a determining unit 2003, configured to determine a modulation and coding scheme MCS of a link according to the target channel information measurement result.

Optionally, in this embodiment, the measurement bandwidth indication field includes a first indication field.

The first indication field is used to instruct the target network device to measure the channel information over entire transmission bandwidth; or the first indication field is used to instruct the target network device to measure the channel information over partial transmission bandwidth.

Optionally, in this embodiment, the measurement bandwidth indication field includes a second indication field.

The second indication field is used to instruct the target network device to measure the channel information over a specified resource block.

In the technical solution provided in this embodiment of the present application, a first sending module 2001 of the network device sends a first PPDU to a target network device, the first PPDU indicates that the target network device needs to send a channel information measurement result, the first PPDU further includes a measurement bandwidth indication field, and the measurement bandwidth indication field is used to instruct the target network device to measure channel information over target bandwidth. A first receiving module 2002 receives a second PPDU including the channel information measurement result and sent by the target network device, where the target network device measures the channel information over the target bandwidth to obtain the channel information measurement result. A determining unit 2003 performs link adaptation adjustment according to the channel information measurement result. Therefore, in comparison with the prior art, in this embodiment of the present application, a measurement bandwidth indication field is further carried in a PPDU to specify bandwidth over which channel information is to be measured, so as to obtain a channel information measurement result that can reflect a channel status of the specified bandwidth. Therefore, in comparison with the prior art in which link adaptation adjustment is performed by default according to a channel information result measured over entire transmission bandwidth, in this embodiment of the present application, bandwidth over which channel information is to be measured can be flexibly specified, and link adaptation adjustment is performed according to a corresponding channel information result, so as to provide accurate link adaptation for each user in an OFDMA communications system.

Figure 21:
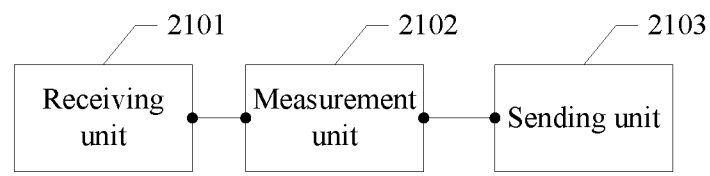
FIG. 21 is a schematic diagram of another embodiment of a network device according to the embodiments of the present application.

The following describes another network device in a solicited feedback mechanism. For details, refer to FIG. 21. Another embodiment of a network device in the embodiments of the present application includes:

The network device in this embodiment of the present application can implement the procedure in the embodiment shown in FIG. 6. The network device includes:

a receiving unit 2101, configured to receive a first PPDU sent by a target network device, where the first PPDU indicates that the network device needs to send a channel information measurement result, and the first PPDU further includes a measurement bandwidth indication field, where the measurement bandwidth indication field is used to instruct the network device to measure channel information over target bandwidth;

a measurement unit 2102, configured to measure the channel information over the target bandwidth by using the first PPDU, to obtain a channel information measurement result; and a sending unit 2103, configured to send a second PPDU including the channel information measurement result to the target network device, where the second PPDU is used by the target network device to determine an MCS of a link according to the channel information measurement result indicated by the second PPDU.

Optionally, in this embodiment, the measurement bandwidth indication field includes a first indication field.

The first indication field is used to instruct the target network device to measure the channel information over entire transmission bandwidth; or the first indication field is used to instruct the second network device to measure the channel information over partial transmission bandwidth.

Optionally, in this embodiment, the measurement bandwidth indication field includes a second indication field.

The second indication field is used to instruct the target network device to measure the channel information over a specified resource block.

In the technical solution provided in this embodiment of the present application, a receiving unit 2101 of the network device receives a first PPDU sent by a target network device, the first PPDU indicates that the network device needs to send a channel information measurement result, the first PPDU further includes a measurement bandwidth indication field, and the measurement bandwidth indication field is used to instruct the network device to measure channel information over target bandwidth. A measurement unit 2102 measures the channel information over the target bandwidth by using the first PPDU, to obtain a channel information measurement result. A sending unit 2103 sends a second PPDU including the channel information measurement result to the target network device, where the second PPDU is used by the target network device to perform link adaptation adjustment according to the channel information measurement result indicated by the second PPDU. Therefore, in comparison with the prior art, in this embodiment of the present application, a measurement bandwidth indication field is further carried in a PPDU to specify bandwidth over which channel information is to be measured, so as to obtain a channel information measurement result that can reflect a channel status of the specified bandwidth. Therefore, in comparison with the prior art in which link adaptation adjustment is performed by default according to a channel information result measured over entire transmission bandwidth, in this embodiment of the present application, bandwidth over which channel information is to be measured can be flexibly specified, and link adaptation adjustment is performed according to a corresponding channel information result, so as to provide accurate link adaptation for each user in an OFDMA communications system.

Figure 22:
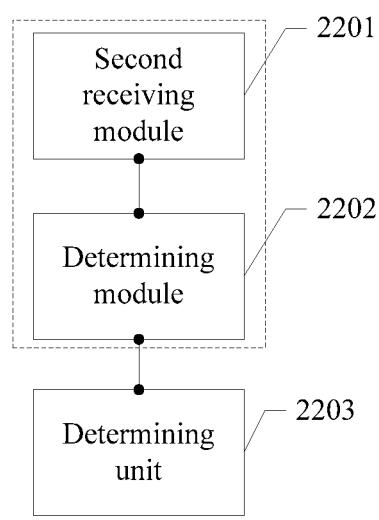
FIG. 22 is a schematic diagram of another embodiment of a network device according to the embodiments of the present application.

The following describes a network device in an unsolicited feedback mechanism. For details, refer to FIG. 22. Another embodiment of a network device in the embodiments of the present application includes:

The network device in this embodiment of the present application can implement the procedure in the embodiment shown in FIG. 13. The network device includes:

a second receiving module 2201, configured to receive a PPDU sent by a target network device, where the PPDU indicates that the target network device unsolicitedly sends a channel information measurement result, and the PPDU further includes a measurement bandwidth indication field, where the measurement bandwidth indication field is used to indicate bandwidth over which the target network device measures the channel information;

a determining module 2202, configured to determine a target channel information measurement result according to the measurement bandwidth indication field; and a determining unit 2203, configured to determine a modulation and coding scheme MCS of a link according to the target channel information measurement result.

Optionally, in this embodiment, the measurement bandwidth indication field includes a first indication field.

The first indication field is used to indicate that the target network device measures the channel information over entire transmission bandwidth; or the first indication field is used to indicate that the target network device measures the channel information over partial transmission bandwidth.

Optionally, in this embodiment, the measurement bandwidth indication field includes a second indication field.

The second indication field is used to indicate a resource block or resource blocks over which the target network device measures the channel information.

In the technical solution provided in this embodiment of the present application, a second receiving module 2201 of the network device receives a PPDU sent by a target network device, the PPDU indicates that the target network device unsolicitedly sends a channel information measurement result, the PPDU further includes a measurement bandwidth indication field, and the measurement bandwidth indication field is used to indicate bandwidth over which the target network device measures channel information. A determining module 2202 determines a target channel information measurement result according to the measurement bandwidth indication field. A determining unit 2203 performs link adaptation adjustment according to the target channel information measurement result. In this way, the network device can choose a channel information result measured over specified bandwidth, to perform link adaptation adjustment. Therefore, in comparison with the prior art, in this embodiment of the present application, a measurement bandwidth indication field is further carried in a PPDU to specify bandwidth over which channel information is measured, so that the network device learns bandwidth over which a channel information measurement result is obtained through measurement. Therefore, in comparison with the prior art in which link adaptation adjustment is performed by default according to a channel information result measured over entire transmission bandwidth, in this embodiment of the present application, bandwidth can be flexibly chosen and link adaptation adjustment is performed according to a channel information result measured over the bandwidth, so as to provide accurate link adaptation for each user in an OFDMA communications system.

Figure 23:
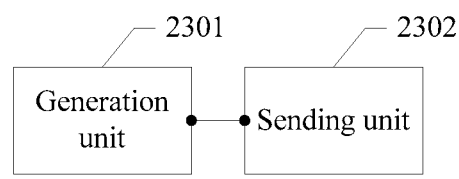
FIG. 23 is a schematic diagram of another embodiment of a network device according to the embodiments of the present application.

The following describes another network device in an unsolicited feedback mechanism. For details, refer to FIG. 23. Another embodiment of a network device in the embodiments of the present application includes:

The network device in this embodiment of the present application can implement the procedure in the embodiment shown in FIG. 14. The network device includes:

a generation unit 2301, configured to generate a PPDU, where the PPDU indicates that the network device unsolicitedly sends a channel information measurement result, and the PPDU further includes a measurement bandwidth indication field, where the measurement bandwidth indication field is used to indicate bandwidth over which the network device measures channel information; and a sending unit 2302, configured to send the PPDU to a target network device, where the PPDU is used by the target network device to determine a target channel information measurement result according to the measurement bandwidth indication field, and an MCS of a link is determined according to the target channel information measurement result.

Optionally, in this embodiment, the measurement bandwidth indication field includes a first indication field.

The first indication field is used to indicate that the target network device measures the channel information over entire transmission bandwidth; or the first indication field is used to indicate that the target network device measures the channel information over partial transmission bandwidth.

Optionally, in this embodiment, the measurement bandwidth indication field includes a second indication field.

The second indication field is used to indicate a resource block or resource blocks over which the second network device measures the channel information.

In the technical solution provided in this embodiment of the present application, a generation unit 2301 of the network device generates a PPDU, the PPDU indicates that the network device unsolicitedly sends a channel information measurement result, the PPDU further includes a measurement bandwidth indication field, and the measurement bandwidth indication field is used to indicate bandwidth over which the network device measures channel information. A sending unit 2302 sends the PPDU to a target network device, where the PPDU is used by the target network device to determine a target channel information measurement result according to the measurement bandwidth indication field, and link adaptation adjustment is performed according to the target channel information measurement result, so that the target network device chooses bandwidth, and performs link adaptation adjustment according to a channel information result measured over the bandwidth. Therefore, in comparison with the prior art, in this embodiment of the present application, a measurement bandwidth indication field is carried in a PPDU to specify bandwidth over which channel information is measured, so that a target network device learns bandwidth over which a channel information measurement result is obtained through measurement. Therefore, in comparison with the prior art in which link adaptation adjustment is performed by default according to a channel information result measured over entire transmission bandwidth, in this embodiment of the present application, bandwidth can be flexibly chosen and link adaptation adjustment is performed according to a channel information result measured over the bandwidth, so as to provide accurate link adaptation for each user in an OFDMA communications system.

Figure 24:
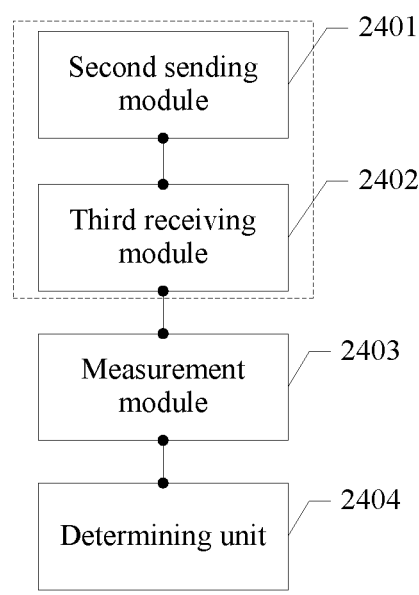
FIG. 24 is a schematic diagram of another embodiment of a network device according to the embodiments of the present application.

The following describes a network device in a TRQ mode. For details, refer to FIG. 24. Another embodiment of a method of a network device in the embodiments of the present application includes:

The network device in this embodiment of the present application can implement the procedure in the embodiment shown in FIG. 16. The network device includes:

a second sending module 2401, configured to send a first PPDU to a target network device, where the first PPDU indicates that the target network device needs to send a probe PPDU, and the first PPDU further includes a measurement bandwidth indication field, where the measurement bandwidth indication field is used to indicate that the network device needs to measure channel information over target bandwidth;

a third receiving module 2402, configured to receive a second PPDU, where the second PPDU is the probe PPDU generated by the target network device according to the measurement bandwidth indication field;

a measurement module 2403, configured to measure the channel information over the target bandwidth by using the second PPDU, to obtain a target channel information measurement result; and a determining unit 2404, configured to determine a modulation and coding scheme MCS of a link according to the target channel information measurement result.

Optionally, in this embodiment, the measurement bandwidth indication field includes a first indication field.

The first indication field is used to indicate that the network device needs to measure the channel information over entire transmission bandwidth; or the first indication field is used to indicate that the network device needs to measure the channel information over partial transmission bandwidth.

Optionally, in this embodiment, the measurement bandwidth indication field includes a second indication field.

The second indication field is used to indicate that the network device needs to measure the channel information over a specified resource block.

In the technical solution provided in this embodiment of the present application, a second sending module 2401 of the network device sends a first PPDU to a target network device, the first PPDU indicates that the target network device needs to send a probe PPDU, the first PPDU further includes a measurement bandwidth indication field, and the measurement bandwidth indication field is used to indicate that the network device needs to measure channel information over target bandwidth. A third receiving module 2402 receives a second PPDU, and the second PPDU is the probe PPDU generated by the target network device according to the measurement bandwidth indication field. A measurement module 2403 measures the channel information over the target bandwidth by using the second PPDU. A determining unit 2404 performs link adaptation adjustment according to the channel information. Therefore, in comparison with the prior art, in this embodiment of the present application, a measurement bandwidth indication field is further carried in a first PPDU to specify bandwidth over which channel information is to be measured, so as to obtain a channel information measurement result that can reflect a channel status of the specified bandwidth. Therefore, in comparison with the prior art in which link adaptation adjustment is performed by default according to a channel information result measured over entire transmission bandwidth, in this embodiment of the present application, bandwidth over which channel information is to be measured can be flexibly specified, and link adaptation adjustment is performed according to a corresponding channel information result, so as to provide accurate link adaptation for each user in an OFDMA communications system.

Figure 25:
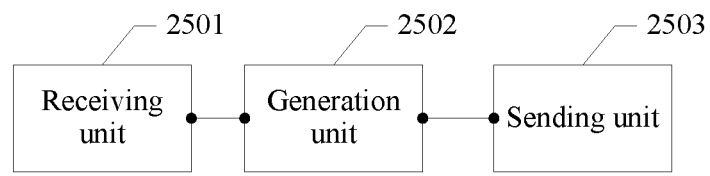
FIG. 25 is a schematic diagram of another embodiment of a network device according to the embodiments of the present application.

The following describes another network device in a TRQ mode. For details, refer to FIG. 25. Another embodiment of a network device in the embodiments of the present application includes:

The network device in this embodiment of the present application can implement the procedure in the embodiment shown in FIG. 17. The network device includes:

a receiving unit 2501, configured to receive a first PPDU sent by a target network device, where the first PPDU indicates that the network device needs to send a probe PPDU, and the first PPDU further includes a measurement bandwidth indication field, where the measurement bandwidth indication field is used to indicate that the network device needs to measure channel information over target bandwidth;

a generation unit 2502, configured to generate a second PPDU, where the second PPDU is the probe PPDU generated according to the measurement bandwidth indication field; and a sending unit 2503, configured to send the second PPDU to the target network device, where the second PPDU is used by the target network device to measure the channel information over the target bandwidth, and link adaptation adjustment is performed according to the channel information.

Optionally, in this embodiment, the measurement bandwidth indication field includes a first indication field.

The first indication field is used to indicate that the network device needs to measure the channel information over entire transmission bandwidth; or the first indication field is used to indicate that the network device needs to measure the channel information over partial transmission bandwidth.

Optionally, in this embodiment, the measurement bandwidth indication field includes a second indication field.

The second indication field is used to indicate that the network device needs to measure the channel information over a specified resource block.

In the technical solution provided in this embodiment of the present application, a receiving unit 2501 of the network device receives a first PPDU sent by a target network device, the first PPDU indicates that the network device needs to send a probe PPDU, the first PPDU further includes a measurement bandwidth indication field, and the measurement bandwidth indication field is used to indicate that the target network device needs to measure channel information over target bandwidth. A generation unit 2502 generates a second PPDU, and the second PPDU is the probe PPDU generated by the network device according to the measurement bandwidth indication field. Then, a sending unit 2503 sends the second PPDU to the target network device, where the second PPDU is used by the target network device to measure the channel information over the target bandwidth, and link adaptation adjustment is performed according to the channel information. Therefore, in comparison with the prior art, in this embodiment of the present application, a measurement bandwidth indication field is further carried in a PPDU to specify bandwidth over which channel information is to be measured, so as to obtain a channel information measurement result that can reflect a channel status of the specified bandwidth. Therefore, in comparison with the prior art in which link adaptation adjustment is performed by default according to a channel information result measured over entire transmission bandwidth, in this embodiment of the present application, bandwidth over which channel information is to be measured can be flexibly specified, and link adaptation adjustment is performed according to a corresponding channel information result, so as to provide accurate link adaptation for each user in an OFDMA communications system.

It can be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections via some interfaces, apparatuses, or units, and may be electrical connections, mechanical connections, or connections in other forms.

The units described as separate parts may or may not be physically separate. Parts displayed as units may or may not be physical units, and may be located in one position, or may be distributed in a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium, and includes several instructions for instructing a computer device (which may be a personal computer, a server, a network device, or the like) to perform all or some of the steps of the methods described in the embodiments of the present application. The foregoing storage medium includes: any medium that can store program code, such as a USB flash drive, a removable hard disk, a read-only memory (ROM,), a random access memory (RAM), a magnetic disk, or an optical disc.

The foregoing embodiments are merely intended for describing the technical solutions of the present application, but not for limiting the present application. Although the present application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A wireless local area network (WLAN) link adaptation apparatus, comprising a processor and a computer-readable storage medium storing instructions, the instructions, when executed by the processor, instruct the apparatus to perform:

sending, a first physical layer protocol data unit (PPDU) to a second network device, wherein the first PPDU comprises: information indicating that a link adaptation procedure in a solicited feedback mechanism is to be performed, a first indication field and a second indication field, wherein the first indication field indicates a bandwidth which is divided into a set of multiple resource blocks according to a preset resource division rule corresponding to the bandwidth, and the second indication field indicates a particular resource block, in the set, over which the second network device is requested to measure a channel information measurement result, wherein the first indication field and the second indication field jointly specify a location of the resource block in the bandwidth;

receiving a second PPDU comprising the channel information measurement result, wherein the channel information measurement result is a measurement result obtained by the second network device by measuring channel information on the first PPDU over the resource block jointly indicated by the first indication field and the second indication field, and the channel information measurement result comprises a recommended modulation and coding scheme (MCS) of the resource block; and obtaining the recommended MCS according to the channel information measurement result.

2. The WLAN link adaptation apparatus according to claim 1, wherein the channel information measurement result further comprises a recommended space-time stream quantity.

3. The apparatus according to claim 1, wherein the resource block includes 26 subcarriers or 52 subcarriers.

4. The apparatus according to claim 1, wherein the transmission bandwidth is 20 MHz or 40 MHz.

5. The apparatus according to claim 1, wherein the second indication field indicates a location of the resource block in the multiple resource blocks by indicating an offset of the resource block.

6. A wireless local area network (WLAN) link adaptation apparatus comprises a processor and a computer-readable storage medium storing instructions, the instructions, when executed by the processor, instruct the apparatus to perform:

receiving a physical layer protocol data unit (PPDU) sent by a second network device, wherein the PPDU comprises:

information indicating that the second network device unsolicitedly sends a channel information measurement result, and a channel information measurement result and a first indication field and a second indication field, wherein the first indication field indicates a bandwidth which is divided into a set of multiple resource blocks according to a preset resource division rule corresponding to the bandwidth, and the second indication field indicates a particular resource block, in the set over which the channel information measurement result is measured, wherein the first indication field and the second indication field jointly specify a location of the resource block in the bandwidth, and wherein the channel information measurement result comprises a recommended modulation and coding scheme (MCS) of the resource block; and obtaining the recommended MCS according to the channel information measurement result.

7. The apparatus according to claim 6, wherein the resource block includes 26 subcarriers or 52 subcarriers.

8. The apparatus according to claim 6, wherein the transmission bandwidth is 20 MHz or 40 MHz.

9. The apparatus according to claim 6, wherein the second indication field indicates a location of the resource block in the multiple resource blocks by indicating an offset of the resource block.

10. A WLAN link adaptation apparatus, comprising a processor and a computer-readable storage medium storing instructions, the instructions, when executed by the processor, instruct the apparatus to perform:

receiving a first physical layer protocol data unit (PPDU) from a first network device, wherein the first PPDU comprises information indicating that a link adaptation procedure in a solicited feedback mechanism is to be performed, a first indication field and a second indication field, the first indication field indicating a bandwidth which is divided into a set of multiple resource blocks according to a preset resource division rule corresponding to the bandwidth, and the second indication field indicates a particular resource block, in the set over which the second network device is requested to measure a channel information measurement result, wherein the first indication field and the second indication field jointly specify a location of the resource block in the bandwidth;

measuring the channel information on the first PPDU over the resource block, to obtain the channel information measurement result, wherein the channel information measurement result comprises a recommended modulation and coding scheme (MCS) of the resource block; and sending a second PPDU comprising the channel information measurement result to the first network device, wherein the channel information measurement result indicated by the second PPDU is used by the first network device to obtain the recommended MCS.

11. The WLAN link adaptation apparatus according to claim 10, wherein the channel information measurement result further comprises a recommended space-time stream quantity.

12. The apparatus according to claim 10, wherein the resource block includes 26 subcarriers or 52 subcarriers.

13. The apparatus according to claim 10, wherein the bandwidth is 20 MHz or 40 MHz.

14. The apparatus according to claim 10, wherein the second indication field indicates a location of the resource block in the multiple resource blocks by indicating an offset of the resource block.

15. A WLAN link adaptation apparatus, comprising a processor and a computer-readable storage medium storing instructions, the instructions, when executed by the processor, instruct the apparatus to perform the following steps:

generating a physical layer protocol data unit (PPDU), wherein the PPDU comprises information indicating that the second network device unsolicitedly sends a channel information measurement result, and the channel information measurement result, a first indication field and a second indication field, the first indication field indicating a bandwidth which is divided into a set of multiple resource blocks according to a preset resource division rule corresponding to the bandwidth, and the second indication field indicates a particular resource block, in the set, over which the channel information measurement result is measured, wherein the first indication field and the second indication field jointly specify a location of the resource block in the bandwidth, and wherein the channel information measurement result comprises a recommended modulation and coding scheme (MCS) of the resource block; and sending the PPDU to a first network device.

16. The WLAN link adaptation apparatus according to claim 15, wherein the channel information measurement result further comprises a recommended space-time stream quantity.

17. The apparatus according to claim 15, wherein the resource block includes 26 subcarriers or 52 subcarriers.

18. The apparatus according to claim 15, wherein the bandwidth is 20 MHz or 40 MHz.

19. The apparatus according to claim 15, wherein the second indication field indicates a location of the resource block in the multiple resource blocks by indicating an offset of the resource block.

20. A non-transitory computer-readable storage medium, wherein the non-transitory computer-readable storage medium includes instructions instructing a network device to perform:

receiving a first physical layer protocol data unit (PPDU) from a target network device, wherein the first PPDU comprises information indicating that a link adaptation procedure in a solicited feedback mechanism is to be performed, a first indication field and a second indication field, the first indication field indicating a bandwidth which is divided into a set of multiple resource blocks according to a preset resource division rule corresponding to the bandwidth, and the second indication field indicates a particular resource block, in the set, over which the second network device is requested to measure a channel information measurement result, wherein the first indication field and the second indication field jointly specify a location of the resource block in the bandwidth;

measuring the channel information on the first PPDU over the resource block, to obtain the channel information measurement result, wherein the channel information measurement result comprises a recommended modulation and coding scheme (MCS) of the resource block; and sending, to the target network device, a second PPDU comprising the channel information measurement result, wherein the channel information measurement result is used by the target network device to obtain the recommended MCS.

21. The non-transitory computer-readable storage medium according to claim 20, wherein the channel information measurement result further comprises a recommended space-time stream quantity.

22. The non-transitory computer-readable storage medium according to claim 20, wherein the resource block includes 26 subcarriers or 52 subcarriers.

23. The non-transitory computer-readable storage medium according to claim 20, wherein the bandwidth is 20 MHz or 40 MHz.

24. The non-transitory computer-readable storage medium according to claim 20, wherein the second indication field indicates a location of the resource block in the multiple resource blocks by indicating an offset of the resource block.

25. A non-transitory computer-readable storage medium, wherein the non-transitory computer-readable storage medium includes instructions instructing a network device to perform:

generating a physical layer protocol data unit (PPDU), wherein the PPDU comprises
information indicating that the network device unsolicitedly sends a channel information measurement result, and
the channel information measurement result, a first indication field and a second indication field,
the first indication field indicating a bandwidth which is divided into a set of multiple resource blocks according to a preset resource division rule corresponding to the bandwidth, and the second indication field indicates a particular resource block, in the set over which the channel information measurement result is measured, wherein the first indication field and the second indication field jointly specify a location of the resource block in the bandwidth, and wherein the channel information measurement result comprises a recommended modulation and coding scheme (MCS) of the resource block; and sending the PPDU to a target network device.

26. The non-transitory computer-readable storage medium according to claim 25, wherein the channel information measurement result further comprises a recommended space-time stream quantity.

27. The non-transitory computer-readable storage medium according to claim 25, wherein the resource block includes 26 subcarriers or 52 subcarriers.

28. The non-transitory computer-readable storage medium according to claim 25, wherein the bandwidth is 20 MHz or 40 MHz.

29. The non-transitory computer-readable storage medium according to claim 25, wherein the second indication field indicates a location of the resource block in the multiple resource blocks by indicating an offset of the resource block.

* * * * *

UNITED STATES PATENT AND TRADEMARK OFFICE
CERTIFICATE OF CORRECTION

PATENT NO. : 10,784,985 B2  
APPLICATION NO. : 15/853937  
DATED : September 22, 2020  
INVENTOR(S) : Jian Yu et al.

Page 1 of 1

It is certified that error appears in the above-identified patent and that said Letters Patent is hereby corrected as shown below:

In the Claims

Column 42, Line 66, please insert --,-- between "receiving" and "a second".

Column 43, Line 9, please insert --,-- between "obtaining" and "the recommended".

Column 44, Line 3, please delete "indicates" and insert --indicating-- between "field" and "a particular".

Column 44, Line 4, please insert --,-- between "set" and "over".

Column 44, Line 46, please delete "indicates" and insert --indicating-- between "field" and "a particular".

Column 45, Line 14, please delete "indicates" and insert --indicating-- between "field" and "a particular".

Column 46, Line 19, please delete "indicates" and insert --indicating-- before "a particular".

Column 46, Line 19, please insert --,-- between "set" and "over".

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*